US011537516B1

(12) United States Patent
Jung et al.

(10) Patent No.: US 11,537,516 B1
(45) Date of Patent: Dec. 27, 2022

(54) MULTI-TIER CACHE FOR A DISTRIBUTED STORAGE SYSTEM

(71) Applicant: Amazon Technologies, Inc., Seattle, WA (US)

(72) Inventors: Tyler Michael Jung, Seattle, WA (US); Slavcho Georgiev Slavchev, Seattle, WA (US); Nishant Jain, Bothell, WA (US); Vishwas Narendra, Evanston, IL (US); Nikhil Shah, Redmond, WA (US); James Zuber, Seattle, WA (US); Sameer Choudhary, Seattle, WA (US); Christopher A. Stephens, Fall City, WA (US); Suchindra Yogendra Agarwal, Kirkland, WA (US); Phillip H. Pruett, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/491,004

(22) Filed: Sep. 30, 2021

(51) Int. Cl.
*G06F 12/08* (2016.01)
*G06F 12/0802* (2016.01)

(52) U.S. Cl.
CPC ................. *G06F 12/0802* (2013.01)

(58) Field of Classification Search
CPC .................................................. G06F 12/0802
USPC ....................................................... 711/118
See application file for complete search history.

(56) References Cited

U.S. PATENT DOCUMENTS

2012/0110113 A1\* 5/2012 Lee ....................... H04L 67/288
709/205

\* cited by examiner

*Primary Examiner* — Jae U Yu
(74) *Attorney, Agent, or Firm* — Knobbe, Martens, Olson & Bear, LLP

(57) ABSTRACT

Systems and methods are provided for using a distributed cache architecture with different methods to load balance requests depending upon whether a requested data item is a freely-requested item (e.g., a "hot key"). The cache may be implemented as a consistent hash ring, and most keys may be assigned to particular node based on a consistent hash. For hot key requests, the requests may be distributed among a subset of nodes rather than being assigned to a specific node using consistent hashing. When a witness service is used to ensure that cached data is fresh, verification requests for data regarding hot keys may be batched to avoid overloading the witness service with hot key requests.

20 Claims, 22 Drawing Sheets

MULTI-TIER CACHE FOR A DISTRIBUTED STORAGE SYSTEM

CROSS-REFERENCE TO CONCURRENTLY-FILED APPLICATIONS

This application is being filed concurrently with the following U.S. Applications, each of which is incorporated by reference in its entirety and made part of this specification:

| U.S. application No. | Title | Filing Date |
|---|---|---|
| 17/449,574 | REQUEST ROUTING MANAGEMENT FOR A DISTRIBUTED STORAGE SYSTEM | Sep. 30, 2021 |
| 17/449,585 | DATA ITEM AND WITNESS SERVICE PARTITIONING IN A DISTRIBUTED STORAGE SYSTEM | Sep. 30, 2021 |
| 17/449,597 | WITNESS SERVICE FOR ENSURING DATA CONSISIENCY IN A DISTRIBUTED STORAGE SYSTEM | Sep. 30, 2021 |
| 17/449,624 | TRANSACTION MANAGEMENT FOR MONOTONIC WRITE CONSISTENCY IN A DISTRIBUTED STORAGE SYSTEM | Sep. 30, 2021 |
| 17/491,029 | DATA EVENT MANAGEMENT FOR MONOTONIC READ CONSISIENCY IN A DISTRIBUTED STORAGE SYSTEM | Sep. 30, 2021 |

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length. For example, an object storage service may provide an interface compliant with the Representational State Transfer (REST) architectural style, such as by allowing I/O based on calls designating input data and a hypertext transport protocol request method (e.g., GET, PUT, POST, DELETE, etc.) to be applied to that data. By transmitting a call designating input data and a request method, a client can thus retrieve the data from an object storage service, write the data to the object storage service as a new object, modify an existing object, etc. Some storage services provide caching services. A cache is a high-speed data store which stores a subset of data, typically transient in nature, so that future requests for that data are served up faster than is possible by accessing the data's primary storage location.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
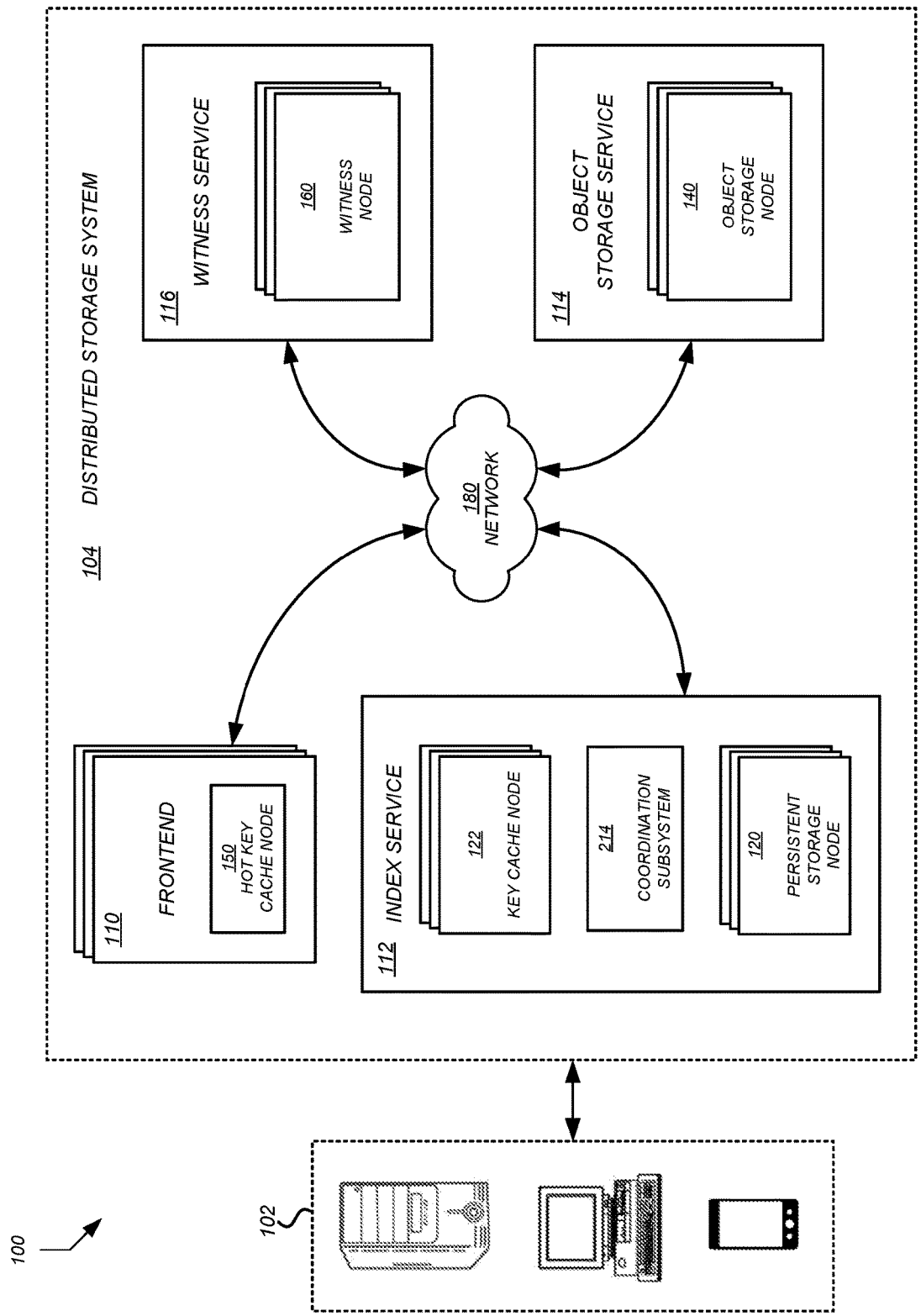
FIG. 1 is a block diagram depicting an illustrative environment in which a distributed storage system can operate using a caching index service and a witness service according to some embodiments.

Generally described, the present disclosure relates to managing storage nodes (e.g., cache nodes and/or persistent storage nodes) in a distributed storage system such that data consistency is ensured across the distributed storage system. Consistency is ensured in part through use of a consistency verification service, also referred to as a witness service. The witness service maintains data regarding the most recent change to—or otherwise most up-to-date version of—each data item of the distributed storage system that may be cached or otherwise stored. In high volume distributed storage systems, various optimizations and related features may be implemented to reduce the load on the consistency witness service.

Some distributed storage systems provide caches for high-speed retrieval of data that would otherwise require reading the data from comparatively slower persistent storage, performing additional network hops, etc. In a high-volume storage system that is distributed among a large number of separate physical devices (e.g., thousands or tens of thousands) and across sometimes great geographic distances (e.g., hundreds or thousands of miles), caches can significantly reduce the time for responding to a data request. Some distributed storage systems improve data availability by replicating data across any number of storage nodes that are necessarily implemented as caches. However, cached and other replicated data does not immediately reflect changes to the corresponding data stored in an authoritative source. When cached and other replicated data is out of sync with the corresponding data stored in the authoritative storage node, the data may be referred to as "stale." Stale data in distributed systems can result in inconsistent data retrieval results whereby a data item is modified and, after the modification, different read requests may return different results depending upon whether the cache node and/or replica storage node involved in servicing the request has been updated with the modified data.

Conventional distributed systems attempt to improve the "freshness" of caches and replicas through various techniques. For example, a distributed system may introduce latency to ensure that, after data is modified, the data replication process is able to complete before serving read requests for the data. To avoid introduction of latency, some conventional systems allow eventual consistency of the persistently-stored data (including data replicated across multiple storage nodes) and the corresponding cached and replicated data.

Some aspects of the present disclosure provide for strong consistency of cached and persistently-stored data in a distributed storage system, while also minimizing or eliminating the latency that would otherwise be associated with such strong consistency. Generally described, strong consistency refers to a property of distributed storage systems whereby any request for a data item occurring after the data item has been changed in one location will result in access to the changed data item or a copy thereof, even if the subsequent request is made shortly after the data item has been changed on one storage node and/or the subsequent request is being serviced by another storage node. When a cache is used in addition to a distributed persistent storage system, the issue of cache staleness can interfere with providing strong consistency. For example, a subsequent request that is serviced from a cache node in which a "time to live" ("TTL") for the requested item has not yet expired can result in providing the stale data item from the cache that does not reflect the change to the persistently-stored data item. The issue of cache staleness can be exacerbated in cases where caches are freshened from replicas that may themselves be stale.

To address the issues noted above, among others, a consistency witness service may be implemented. The consistency witness service (also referred to as a "cache freshness witness service" or simply as a "witness service") may be implemented as a streamlined service that provides data regarding the most recent instance of each data item that has been stored in a distributed storage system. The data regarding the most recent instance of storage of a given data item may be related to time or may otherwise be sequential and monotonically-increasing. In some embodiments, a sequence number (e.g., a transaction sequencer) may be used to indicate the relative time or sequence of a data change event or other storage operation for a given data item. Each cached version of the data item may be stored in connection with data regarding the transaction sequencer for the persistently-stored data item to which the cached data item corresponds. When a request for the data item is received by a cache node for servicing, the cache node may check with the witness service to see whether the cached data item stored at the cache node is the most up-to-date version of the requested data item based on the transaction sequencer. If the cached data item is stale (e.g., the transaction sequencer stored at the witness service is greater than the transaction sequencer associated with the cached data item at the cache node), then the cached data item may be invalidated and the cache node may obtain the latest version of the data item from persistent storage. In this way, the benefits of a cache may be realized without the risk of serving stale data (e.g., based on an unexpired TTL).

In distributed storage systems that store a large number of data items (hundreds of millions, billions, or more individual data items) each identified by a unique key, maintaining a record in the witness service for each individual data item may be difficult or impossible, particularly if it is desired that the records be maintained in volatile memory for fast access. To reduce the amount of memory and other computing resources required to store the records, the witness service may compress the relevant data using a hash table in which x data items are stored using y individual records, where y<x. In some embodiments, the degree of compression (e.g., the degree to which y<x) may be high, thus resulting in relatively frequent hash collisions. For example, two or more data items may both be mapped to the same record in the hash table once the keys of the respective data items are hashed. Thus, when one of the data items is updated and the new transaction sequencer is sent to the witness service, the new transaction sequencer will apply to each of the two or more data items mapped to the same record in the hash table. However, this effect of the hash table compression may be acceptable because as long as the sequence number mapped to any given data item via the hash table is equal to or greater than the latest sequence number that actually applies to the data item in persistent storage, then consistency will be maintained. One side effect will be that some cached data items will appear to be stale when they are not actually stale.

In some embodiments, to address potential drawbacks of the compression implemented by the witness service, the witness service may include multiple witness nodes to host multiple instances of the hash table. Each witness node may use different hash functions to maintain their respective instances of the hash table, and therefore the different instances of the hash table are less likely to experience the exact same hash collisions even though each instance may experience a similar number of hash collisions overall. For example, an odd number of hash table instances may be implemented (e.g., 3, 5, 7, or 9) and each may be maintained by a different witness node implemented on a different physical computing device. A majority of the hash table instances may be considered a quorum when performing consistency verification checks. When a request for the data item is received by a cache node for servicing, the cache node may check with each witness node of the witness service (or a subset thereof) to see whether the cached data item stored at the cache node is the most up-to-date version of the requested data item based on the transaction sequencer. If a majority of the witness nodes return a sequence number for the data item that is greater than the sequence number associated with the data item at the cache node, then the cached data item is likely to be stale, even if there are hash collisions for the data item at one or more of the witness nodes. The cached data item may be invalidated and the cache node may obtain the latest version of the data item from persistent storage. However, if a majority of the witness nodes return a transaction sequence number for the data item that matches the transaction sequence number associated with the data item at the cache node, then cached data item is guaranteed to be fresh.

Additional aspects of the present disclosure relate to ensuring the witness service has the most up-to-date information regarding the most up-to-date versions of data items stored in the distributed storage system. When a request is made to store a data item in the storage system (either a new data item, or a modified version of a previously-stored data item), the data item may initially be stored in a transaction log from which persistent storage nodes are then updated. In some embodiments, once the data item is stored in the transaction log, an update is sent to the witness service indicating the transaction sequencer (e.g., transaction log sequence number) for the data item. Successful storage of the data item may then be acknowledged to the source of the storage request. Thus, the witness service can have an updated record of the latest transaction sequencer for the data item even before the data item is stored to persistent storage. When a request for the data item is received by a cache node, the cache node can query the witness service for the latest transaction sequencer and determine that its cached version of the data item is stale. Moreover, the cache node is informed of the transaction sequencer that must be stored to a persistent storage node before the data item can be retrieved from the persistent storage node to service a request and freshen the cache. In this way, the cache node can be prevented from retrieving and serving an out-of-date data item from the persistent storage node when the persistent storage node has not yet been caught up on the corresponding transaction from the transaction log.

In some embodiments, storage of a data item from the transaction log to a persistent data store may trigger an additional update to the witness service. For example, some updates of the witness service during initial storage of the data item to the transaction log may fail (e.g., due to network issues or other issues that may arise in distributed computing systems). In such cases, the distributed storage system may not acknowledge storage of the data item in the transaction log to the source of the data item storage request. This can prevent the source from expecting to access the new version of the data item on subsequent requests. When the transaction log transaction is later stored to the persistent storage nodes, the nodes may first update the witness service with the transaction sequencer, optionally acknowledge storage of the data item to the source of the request, and then store the data items in the respective storage nodes. Thus, now that the new version of the data item is available at the persistent storage nodes, it can be obtained by the cache nodes in response to future requests.

In distributed storage systems, multiple persistent storage nodes may store a copy of the data item. Such persistent storage nodes (also referred to as replica nodes, or simply as storage nodes, to distinguish them from cache nodes) are typically used for load balancing, backup, and general availability and durability of the stored data. However, if each storage node communicates an updated transaction sequencer to the witness service for each data item that is stored to the distributed storage system, the witness service and/or network may be overwhelmed. For example, whereas a single update to the witness service may be made when the data item is saved to the transaction log, the addition of witness service updates when the data item is saved from the transaction log to the storage nodes will result in 1+n updates to the witness service, where n is the number of storage nodes to which the data item is stored. To reduce update traffic to the witness service, the first node that successfully updates the witness service may inform the other storage nodes of the successful update (e.g., using a gossip protocol). The other storage nodes may then omit updating the witness service when the data item is stored from the transaction log to the other storage nodes. Additionally, or alternatively, the storage nodes may batch witness service updates. For example, a storage node may wait until there are x data items ready to be stored from the transaction log to the storage node. The storage node may then send a single witness service update regarding all x data items prior to storing the data items to the storage node. Thus, traffic to the witness service can be reduced on the order of a factor of x, where x is the size of the batch. In some cases, the batch may additionally or alternatively be managed using a time-based criterion. For example, the storage node may wait y units of time between batch updates to the witness service. If only a single data item has been updated in the prior y units of time, the storage node may nevertheless send the update to the witness service and store the data item to persistent storage so as not to introduce a large degree of latency in storage of any given data item. In some cases, the batch may additionally or alternatively be managed using a request-based criterion. For example, the storage node may wait until a request for a data item in the batch has been received, and then send the update to the witness service and store the data item to persistent storage so as not to introduce a large degree of latency to the current requestor.

Further aspects of the present disclosure relate to ensuring a monotonic increase in transaction sequencers for individual data items in a distributed storage system. As described above and in greater detail below, when a request is received to store a data item (e.g., a changed version of an existing data item), the data item is written to a transaction log from which various persistent storage nodes of the distributed storage system are updated. To distinguish and impart order on the transactions in the transaction log, each transaction may be associated with a transaction sequencer. For example, the sequencer may be based on a system clock at the time a write request is received. However, write requests may be received by various nodes, each of which may write (or initiate writing of) the change to the transaction log. Small inconsistencies in the system clocks of the nodes writing the changes to the transaction log can result in some changes being written with a transaction sequencer that is less than or otherwise sequentially prior to the transaction sequencer of a change previously written to the transaction log by a different node. Thus, it may appear on the transaction log that the later-saved transaction occurred before the prior-saved transaction, which can have a negative effect on data consistency when the transactions each apply to the same data item. To prevent this scenario, the transaction log may be read to determine the sequencer of the most recent transaction associated with a data item prior to writing a new data record regarding the data item to the transaction log. If the transaction sequencer for the most-recent prior transaction is greater than the sequencer generated for the current transaction, then the current transaction may be rejected. The source of the request may choose to resubmit the request, during which time another transaction sequencer will be generated and evaluated against the transaction sequencer of the most-recent prior record associated with the data item.

In some embodiments, the content of the data item in the current request may be evaluated against the content of the most recent transaction log record associated with the data item. If the value being requested to be written in the current request is the same value as written in the most recent transaction log record associated with the data item, then the source of the request would have no way of distinguishing between the different transactions because the value stored in persistent storage for the data item after both requests are processed would be the same regardless of the order in which the requests are processed. In this case, rather than reject the request, the request may be acknowledged and the greatest transaction sequencer may be used to store the data to persistent storage and update the witness service.

In some embodiments, if the current request is a complex request that would cause a significant degree of latency and/or inefficient use of computing resources to reject and be resubmitted, the transaction sequencer assigned to the request may be altered. For example, the current request may be a multi-part request. If the transaction sequencer assigned to such a multi-part request happens to be prior to the transaction sequence of the most-recent prior transaction log record associated with the data item (e.g., due to differencing system clocks), then the transaction sequencer assigned to the current request may be adjusted to be greater than the transaction sequencer of the most-recent prior transaction log record. By adjusting the transaction sequencer in this manner, the monotonically-increasing nature of the transaction sequencers for the data item may be maintained, thus contributing to consistency of the data item. Moreover, the transaction is not rejected, thereby avoiding the latency and otherwise inefficient use of computing resources that would otherwise be the case in resubmitting the storage request.

Some aspects of the present disclosure relate to a multi-tier caching architecture in which data items that are requested at a high frequency are cached in a first caching layer, also referred to as a "hot key cache," and other data items that are requested relatively less frequently but which may still benefit from caching are cached at a second caching layer, also referred to as a "key cache."

In some embodiments, the key cache may be implemented using multiple cache nodes configured as a consistent hash ring. In the consistent hash ring, each node may be mapped to a set of keys (representing a corresponding set of data items) using a hash function such that a contiguous portion of the key space, corresponding to data items that are related and often requested close in time with each other, is distributed among multiple cache nodes rather than being concentrated on a single cache node. Thus, this mechanism serves to balance the caching load. In this configuration, requests for a given key will be mapped to the same cache node from request to request, in some cases without regard to the passage of time between requests for the given key.

The hot key cache may be implemented using a different architecture and/or caching scheme than the key cache described above. For example, the hot key cache may be implemented using a randomized load balancing mechanism such that requests for a given key that is associated with a high volume or rate of requests—a "hot key"—will be mapped to different hot key cache nodes from request-to-request in order to balance the load for that specific hot key.

In some embodiments, if the data item cached at a hot key cache node for a requested hot key is invalid or there is otherwise a cache miss, the request can be passed to the key cache in the second caching layer. However, to avoid a significant rate of requests being routed to the consistent hash ring cache node that would be mapped by the hash function to the hot key, a cache miss request from the hot key cache layer can be routed to a pseudo-randomly selected node of the second caching layer. For example, an alternative routing mechanism may be used such that each hot key may be mapped to a subset of nodes in the second caching layer using a function (e.g., a hash function, a modulo function, etc.). When a request for a hot key is received by the second caching layer, the request may be identified as a hot key request. A routing subsystem of the second caching layer may implement the alternative routing mechanism to determine the subset of nodes mapped to the hot key, and randomly select a node of the subset (e.g., using a pseudo-random number generation algorithm). The selected node can then obtain the current version of the data item from persistent storage for caching and responding to client requests. In this way, a single node of the consistent hash ring is less likely to experience such a high demand that it is effectively unable to service any requests (similar to a denial-of-service attack) when cached data items for hot keys are invalidated.

Additional aspects of the present disclosure relate to separating the set of data items stored in a distributed storage system into different subsets, or "partitions," to further organize and manage the large number of data items and volume or requests. Each partition may be associated with a different set of computing resources, such as a transaction log onto which data is written for persistent storage, and a set of persistent storage nodes to service requests for data items in the partition and provide load balancing. Moreover, different instances of the witness service may be used for different subsets of partitions of the distributed storage system. For example, one instance of the witness service may be used to maintain sequence data and respond to verification requests regarding data items in a first subset of partitions, a second instance of the witness service may be implemented on separate hardware than the first instance so that the computing resources of the second instance can maintain sequence data and respond to verification requests regarding data items in a second subset of partitions, and so on.

In some embodiments, the key space for keys of data items stored in the distributed storage system may be used to define and manage partitions such that a first subset of keys may be assigned to a first partition, a second subset of keys may be assigned to a second partition, and so on. The subsets may be defined with respect to the values of the keys themselves. For example, keys of data items may be defined using hexadecimal numbers of preset or varying length, and a partition may be associated with a particular key prefix. Thus, a partition may be defined as the set of all data items with key prefixes matching the particular key prefix of the partition, and not matching any other partition's key prefix that is longer (e.g., more hexadecimal symbols). Illustratively, one partition may be defined as the "f" partition, and another partition may be defined as the "foo" partition, without any partition with a key length longer than three hexadecimal symbols beginning with "foo." In this illustrative example, all data items with keys beginning with "foo" would be part of the "foo" partition, while all other data items with keys beginning with "f" would be part of the "f" partition.

After an initial set of partitions is defined, new data items may continue to be added to the distributed storage system, and different data items may be associated with increasing and/or decreasing rates of requests. In some embodiments, to address the potential growth in data items and changing degree of requests, a control system may monitor requests or otherwise obtain data regarding requests. Based on an analysis of request data, the control system may dynamically generate new partitions by splitting existing partitions. For example, the control system may access request rate data stored by or otherwise associated with an instance of a witness service to determine which partition(s) are associated with a high rate of requests (e.g., as measured or estimated in transactions per second or "TPS"). If a particular partition has a request rate that satisfies a partition splitting criterion (e.g., TPS for the partition exceeds a maximum TPS threshold), then the control system may determine to split the partition into two or more partitions. However, because the witness service is optimized to respond to a high volume of verification requests associated with multiple partitions (e.g., 50,000 partitions or more) rather than providing detailed request metrics and analytics, the amount and nature of request metric data available from the witness service may not be adequate to determine how to optimally split a partition. To aid the control system in determining how to split a partition, the persistent storage nodes of the partition may maintain data regarding request rates for various subsets of the key space of the partition. To ensure that the persistent storage nodes have enough data about the entire key space, including keys that have been cached and for which few or no requests may have been serviced by the persistent storage nodes, the caching layers above the storage nodes may forward, to the persistent storage nodes, requests that are otherwise serviceable by the cache nodes. For example, a small percentage of requests (e.g., 1%, 5%, etc.) may be passed through to the persistent storage nodes even if there is no cache miss, and/or without first making a verification request to the witness service. Thus, the persistent storage nodes may have access to a statistically significant number of requests from which the total request volume can be derived, but without requiring the persistent storage nodes to actually service or even see the vast majority of all requests. The control system may use the request data, maintained by the persistent storage nodes, to identify a key prefix (or subset thereof) that can be split from the current partition in order to split the total request volume equally (or as equally as possible). Thus, the load on the witness service assigned to a particular partition can be effectively balanced. In addition, the risk of overloading and potentially browning out a persistent storage node assigned to keys of a particular partition can be managed.

Further aspects of the present disclosure relate to management of partitions and, in particular, the routing data used by the distributed storage system to route requests to the proper caching layers, witness services, persistent storage nodes, and the like. In some embodiments, data items may be managed in a multi-tier configuration in which they are grouped into different partitions based on their keys (e.g., based on the longest key matching key prefix for which there is a partition), and partitions are grouped into different cells based on their key prefixes (e.g., based on ranges of key prefixes for the individual partitions). When a request is received, an inter-cellular routing layer may use routing data to route the request to a particular cell based on the key of the requested data item and the ranges assigned to the different cells. Inter-cellular routing data can be used to determine the identity of the proper cell for a given request, and may include additional information such as a host name and/or network address to which the request is to be routed. Once routed to a particular cell, an intra-cellular routing layer may use further routing data to route the request to a particular partition based on the prefix of the key and the prefixes assigned to the different partitions. Intra-cellular routing data can be used to determine the identity of the proper partition for a given request, and may include additional information such as a host name and/or network address to which the request is to be routed. Once routed to a particular partition, the request may be handled by a cache node and/or passed to a persistent storage node.

In some embodiments, in addition to partition splitting for request load management as described above, cells may be split and/or partitions moved from cell-to-cell. The transaction log for affected partitions can be used to inform storage nodes, witness services, and the like regarding changes to routing data. For example, once a decision is made to move a partition or set of partitions to a different cell, and/or once a decision is made to split a partition, the routing data for the cells and/or partitions is to be updated. To ensure that requests are being processed using the correct routing data, special transactions may be written to the transaction logs of affected partitions. These special transactions, also referred to as "barrier" transactions, can serve to inform persistent storage nodes of the proper version of routing data that must be used to submit a request that will be handled by the persistent storage nodes. In addition, the barrier transactions can serve to invalidate the caches of data items in the affected partitions so that subsequent requests for data items, even if initially handled by the cache, are eventually routed to the prior persistent storage node to obtain the latest data from the current location. For example, when a barrier transaction is written to a transaction log of a particular partition, the witness service may be updated to reflect the transaction sequencer of the barrier transaction as the latest sequence number for all data items in the partition. Thus, subsequent verification requests for any data item in the partition will result in a cache invalidation and cause retrieval of the data item from its new location (e.g., the computing resources assigned to the new cell and/or partition of the data item).

Various aspects of the disclosure will now be described with regard to certain examples and embodiments, which are intended to illustrate but not limit the disclosure. Although aspects of some embodiments described in the disclosure will focus, for the purpose of illustration, on particular examples of network configurations, data storage architectures, data access protocols, and processing operations, the examples are illustrative only and are not intended to be limiting. In some embodiments, the techniques described herein may be applied to additional or alternative network configurations, data storage architectures, data access protocols, processing operations, and the like Overview of Example Computing Environment FIG. 1 is a block diagram of an illustrative computing environment 100 in which client devices 102 may store data objects to a distributed storage system 104 that includes frontend nodes 110, an index service 112, and an object storage service 114.

By way of illustration, various example client devices 102 (also referred to simply as "clients") are shown in communication with the distributed storage system 104, including a server, a desktop computer, and a laptop. In general, the client devices 102 can be any computing device such as a sever computer, desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, a client device 102 may be a host computing device executing one or more virtual computing systems within a data center, which may or may not be a same data center that includes one or more computing systems of the distributed storage system 104.

Generally described, the distributed storage system 104 can operate to enable clients to read, write, modify, and delete data objects or other data items, each of which represents a set of data associated with an identifier, such as an object key (also referred to simply as a key). Individual data objects may be interacted with as individual resources. For example, an object may represent a single file submitted by a client device 102 (though the distributed storage system 104 may or may not store such an object as a single file). This object-level interaction can be contrasted with other types of storage services, such as block-based storage services providing data manipulation at the level of individual blocks or database storage services providing data manipulation at the level of tables (or parts thereof) or the like.

The distributed storage system 104 illustratively includes one or more frontend nodes 110, which provide an interface (a command-line interface (CLI), application programing interface (API), or other programmatic interface) through which client devices 102 can interface with the system 104. For example, a client device 102 may interact with a frontend node 110 to create a collection of data objects on the system 104 (e.g., a "bucket" of objects) and to configure permissions for that collection. Client devices 102 may thereafter create, read, update, or delete objects within the collection based on the interfaces of the frontend nodes. In one embodiment, the frontend node provides a REST-compliant HTTP interface supporting a variety of request methods, each of which corresponds to a requested I/O operation on the system 104. By way of non-limiting example, request methods may include:

a GET operation requesting retrieval of an object stored on the system 104 by reference to an identifier of the object;

a PUT operation requesting storage of an object to be stored on the system 104, including an identifier of the object and input data to be stored as the object;

a DELETE operation requesting deletion of an object stored on the system 104 by reference to an identifier of the object; and a LIST operation requesting listing of objects within an object collection stored on the system 104 by reference to an identifier of the collection.

During general operation, frontend nodes 110 may be configured to obtain a call to a request method, and apply that request method to input data for the method. For example, a frontend node 110 can respond to a request to PUT input data into the system 104 as an object by storing that input data as the object on the system 104. Objects may be stored, for example, in one or more of the object storage service's object storage nodes 140, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend node 110 can respond to a request to GET an object from the system 104 by retrieving the object from the object storage service 114 (the object representing input data to the GET resource request), and returning the object to a requesting client device 102.

The index service 112 can maintain information about the specific storage location (e.g., network address) at which each data object is stored and accessible in the object storage service 114. For example, data objects may be exposed to clients and interacted with according to a unique identifier for the object, such as a key. In some embodiments, the key may be an alphanumeric string for ease of reference. Use of the key by clients outside of the distributed storage system 104 can shield the clients from the complexity of storing objects in, and accessing objects stored in, the distributed storage system 104. This shielding and simplification for clients can be particularly beneficial when the object storage system is a scalable storage system.

The index service 112 may include a set of persistent storage nodes 120 to store the key map data that represents mappings of data object keys to storage locations at which the data objects are stored in the object storage service 114. The persistent storage nodes 120 may include any number of replica nodes to provide durability and availability of the key map data. When the frontend node 110 receives a request to store, retrieve, or otherwise interact with a data object stored in the object storage server 114, the index service 112 may be employed to determine the specific storage location of the data object identified by key.

In some embodiments, the object storage service 114 may provide an immutable data store. For example, when a data object is stored at a particular location in the object storage service, only that data object, with the data value(s) assigned to the data object at the time of storage, will be stored at that particular location. When a change is made to the data object, the changed data object is stored at a new storage location. Thus, the mapping of the object key to storage location may change each time the data object itself is changed. The index service 112 may therefore serve an important role in maintaining the mapping of data object keys to current storage locations without which it may be difficult or impossible to retrieve the latest version of a data object using the data object key.

To provide faster access to frequently-used key map data, the index service 112 may include a key cache 122 to cache key map records stored in the persistent storage nodes 120. Whenever a data object is changed, the key map data stored in the cache becomes stale because the changed version of the data object is stored at a different location in the object storage service 114. Thus, verifying the freshness of the key cache 122 may become necessary to avoid accessing an old version of the data object after it has been changed.

To provide freshness verification, a witness service 116 may be implemented. The witness service 116 may be notified of any change to the key map data stored in the persistent storage nodes 120. When the key cache 122 is accessed to obtain key map data for a particular key, the key cache 122 may request that the witness service 116 provide data regarding the latest version of the key map data stored in the persistent data store for the key. For example, a transaction sequencer assigned to the key map data when the key map data was written to a transaction log may be used to determine whether a particular cached item of key map data is stale. Cached key map data items maintained at the key cache 122 may be augmented or otherwise associated with additional information, such as the transaction sequencer of the key map data item when it was cached. If the transaction sequencer of the cached key map data item is older (e.g., has a smaller value or otherwise prior value in a sequence) than the transaction sequencer obtained from the witness service 116, then the cached key map data item is stale and the cache node may obtain the latest version of the key map data item from the persistent storage nodes 120.

In some cases, certain data objects may be accessed at an extremely high rate. To provide even more responsive service to requests for such data objects, a hot key cache 150 may be implemented at the front end. Like the key cache 122, the hot key cache 150 may request that the witness service 116 provide data regarding the latest version of the key map data stored in the persistent data store for a requested hot key. Any request associated with a hot key for which the hot key cache 150 has stale data, or for a key that is not maintained in the hot key cache 150, may be passed through to the index service 112.

Although the index service 112 and witness service 116 are shown in FIG. 1 and described herein with reference to examples of caching and verifying the freshness of key map data that maps data object keys to data object storage locations in an object storage service 114, the examples are illustrative only and are not intended to be limiting, required, or exhaustive. In some embodiments, the witness service 116, data caches, and techniques for ensuring consistency of stored data may be applied to various other examples and use cases which may or may not involve location data for objects stored at a separate object storage service 114.

The client devices 102, distributed storage system 104, and/or individual devices thereof may communicate via a network 180, which may include any wired network, wireless network, or combination thereof. For example, the network may be or include a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The distributed storage system 104 is depicted in FIG. 1 as operating in a distributed computing environment including several computer systems that are interconnected using one or more computer networks. The distributed storage system 104 could also operate within a computing environment having a fewer or greater number of devices than are illustrated in FIG. 1. Thus, the depiction of the distributed storage system 104 in FIG. 1 should be taken as illustrative and not limiting to the present disclosure. For example, the distributed storage system 104 or various components thereof could implement various Web services components, hosted or "cloud" computing environments, or peer to peer network configurations to implement at least a portion of the processes described herein. In some instances, the distributed storage system 104 and clients 102 may be part of a same cloud computing service. Further, the distributed storage system 104 and clients 102 may be implemented directly in hardware, or as a combination of software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In some embodiments, any of the components within the distributed storage system 104 can communicate with other components of the distribute storage system 104 via a network. In other embodiments, not all components of the distributed storage system 104 are capable of communicating with all other components of the distributed storage system. In addition, while some functionalities are generally described herein with reference to an individual component of the distributed storage system 104, other components or a combination of components may additionally or alternatively implement such functionalities. Thus, the specific configuration of elements within FIG. 1 is intended to be illustrative only, and is not intended to be limiting, required, or exhaustive.

Consistency Verification

Figure 2:
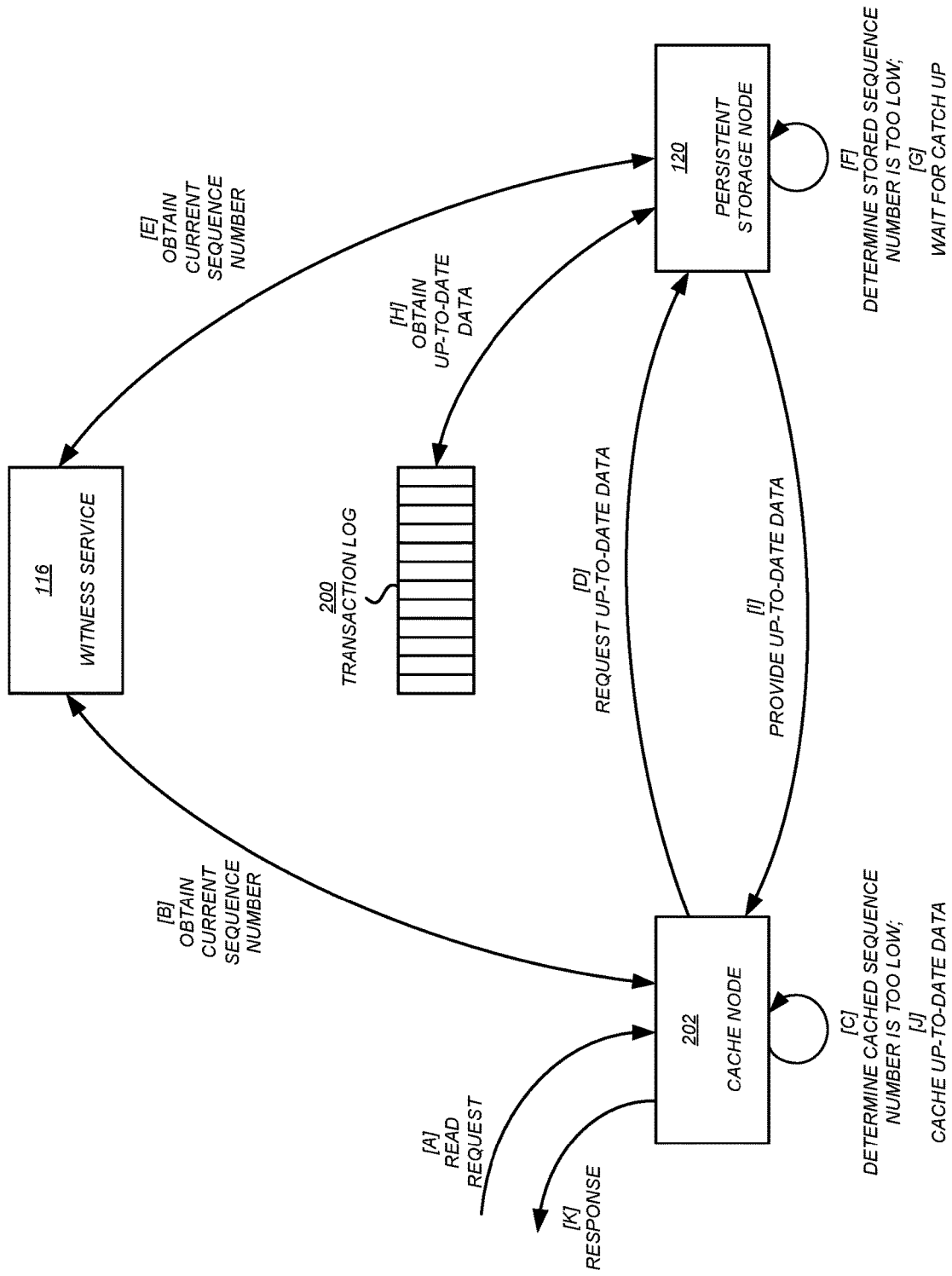
FIG. 2 is a block diagram of illustrate data flows and interactions of components of a distributed storage system to use the witness service to verify that stored data is update to date according to some embodiments.

FIG. 2 illustrates example data flows and interactions between components of a distributed storage system 104 when using a witness service 116 to ensure that the most recent version of a data item is provided in response to a request.

As shown, a request may be initially received at [A] by a cache node 202 (e.g., a node of the hot key cache 150 or key cache 122). Illustratively, the request may be a request for a data item associated with a unique key. Although the cache node 202 may have a cached data item associated with the unique key, the cache node 202 may obtain verification data from the witness service 116 at [B] prior to providing a response. The witness service 116 may provide, to the cache node 202, verification data that includes a sequence number associated with the key. The cache node 202 may determine at [C] that the sequence number received from the witness service 116 is greater than the sequence number associated with the data item cached at the cache node 202. In response to this determination, the cache node 202 can request an up-to-date version of the data time from a persistent storage node 120 at [D].

The persistent storage node 120, or another component of the index service 112 such as a coordinator subsystem 124, may perform a process similar to that performed by the cache node 202 to ensure that an up-to-date version of the requested data item is provided. For example, the persistent storage node 120 may obtain verification data from the witness service 116 at [E] prior to providing a response. The witness service 116 may provide, to the persistent storage node 120, verification data that includes a sequence number associated with the key. The persistent storage node 120 may determine at [F] that the sequence number received from the witness service 116 is greater than the sequence number associated with the data item currently stored at the persistent storage node 120. In response to this determination, the persistent storage node 120 can wait [G] to provide a response until persistent storage of data from the transaction log 200 to the persistent storage node 120 has reached at least the sequence number received from the witness service 116 at [H]. When that happens, the persistent storage node 120 can provide a response to the cache node 202 at [I] including the up-to-date version of data associated with the key.

The cache node 202 can receive and cache the up-to-date version of the data at [J], and then provide a response to the request at [K].

Figure 3:
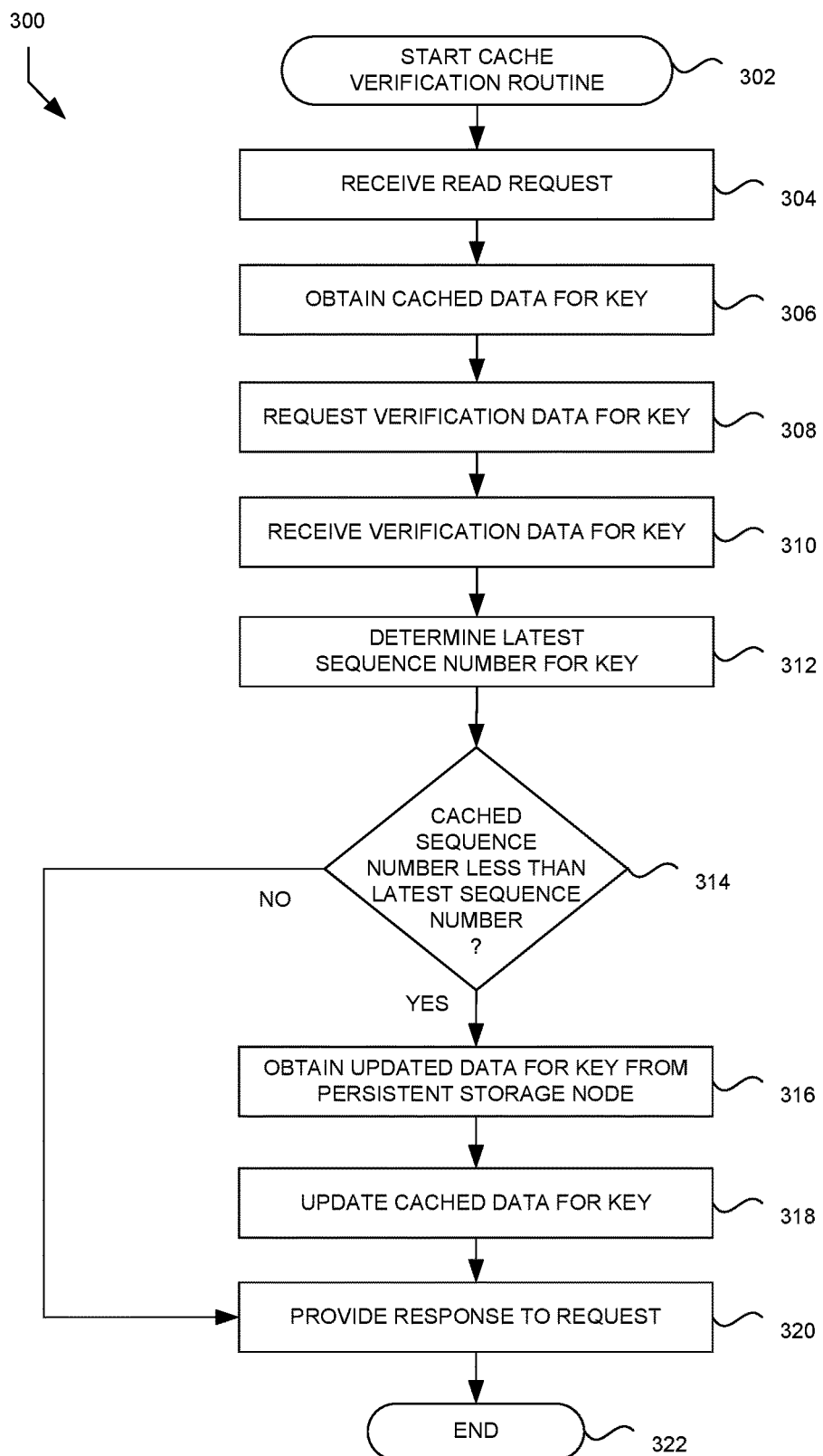
FIG. 3 depicts a flow diagram of an illustrative routine for using a witness service to verify whether data is up to date according to some embodiments.

FIG. 3 is a flow diagram of an illustrative routine 300 that may be executed by a cache node 202 to communicate with the witness service 116 and determine whether cached data (e.g., key map data) is stale or fresh. In some embodiments, the routine 300 may be implemented by a cache node of the hot key cache 150 or key cache 122. Aspects of the routine 300 will be described with further reference to the illustrative cache objects and corresponding records of the verification shown in FIG. 4, and the illustrative data flows and interactions between the cache node and multiple nodes of the witness service shown in FIG. 5.

The routine 300 may begin at block 302 in response to an event, such as when the cache node 202 begins operation. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device and executed. In some embodiments, the routine 300 or portions thereof may be implemented on multiple processors, serially or in parallel.

At block 304, the cache node 202 may receive a request for data stored in the index service 112. In some embodiments, the request may be a request for data associated with a key. For example, the request may be a GET request, and may include the key. The request may be initiated by a client 102 or some other device or system.

In one specific non-limiting embodiment, the request may be received by a frontend node 110. The frontend node 110 may determine whether the key is a "hot key" (e.g., a key that is the subject of a large volume of requests, a key that is assigned to a hot key cache, etc.). If the key is a hot key, the request may be sent to the hot key cache 150 where it may be assigned to a random cache node by a load balancer. In this case, the cache node executing the current instance of the routine 300 is a cache node of the hot key cache 150. Otherwise, if the key that is the subject of the request is not a hot key, then the request may be sent to the key cache 122 where it may be assigned to a particular node based on a hash of the key (e.g., if the key cache 122 is implemented as a consistent hash ring). In this case, the cache node executing the current instance of the routine 300 is a cache node of the key cache 122.

At block 306, the cache node 202 may obtain cached data associated with the key in the request. A typical cache node 202 may maintain cached data for many keys. In some embodiments, the cached data may be cached key map data. An item of cached key map data may include a key and value that corresponds to the key. A typical request that is serviced by the cache node (e.g., a GET request) may be a request for the value that corresponds to the key. The cache node may maintain the cached key map data in memory for fast access and response to such requests.

Although some examples herein are descried with respect to a key being mapped to a value representing the location of another data object, the examples are illustrative only and are not intended to be limiting, required, or exhaustive. In some embodiments the value may be any value or other data that may be associated with a key.

To facilitate various cache freshness verification features, cached data maintained by the cache node 202 may be augmented with additional data (e.g., a cached data item may include or otherwise be associated with data in addition to the key and corresponding value). The cached data may include or otherwise be associated with sequence data, such as a sequence number. For example, a sequence number may represent a relative time of an update event associated with key, or an ordinal position relative other update events associated with the key. In some embodiments, the sequence number may be a transaction log sequence number (also referred to as a "transaction sequencer") used when recording update events associated with the key to a transaction log 200 for persistent storage.

As described in greater detail below, the sequence number may be used to determine whether an update event associated with key has occurred after the update event reflected in the cached data maintained by the cache node 202, in which case the cached data maintained by the cache node 202 is stale. In some embodiments, the cached data may be augmented with routing information to make a remote procedure call in order to verify the cached information with the witness service 116 (e.g., pre-resolved network addresses of the specific witness node(s) 160 to be queried).

Figure 4:
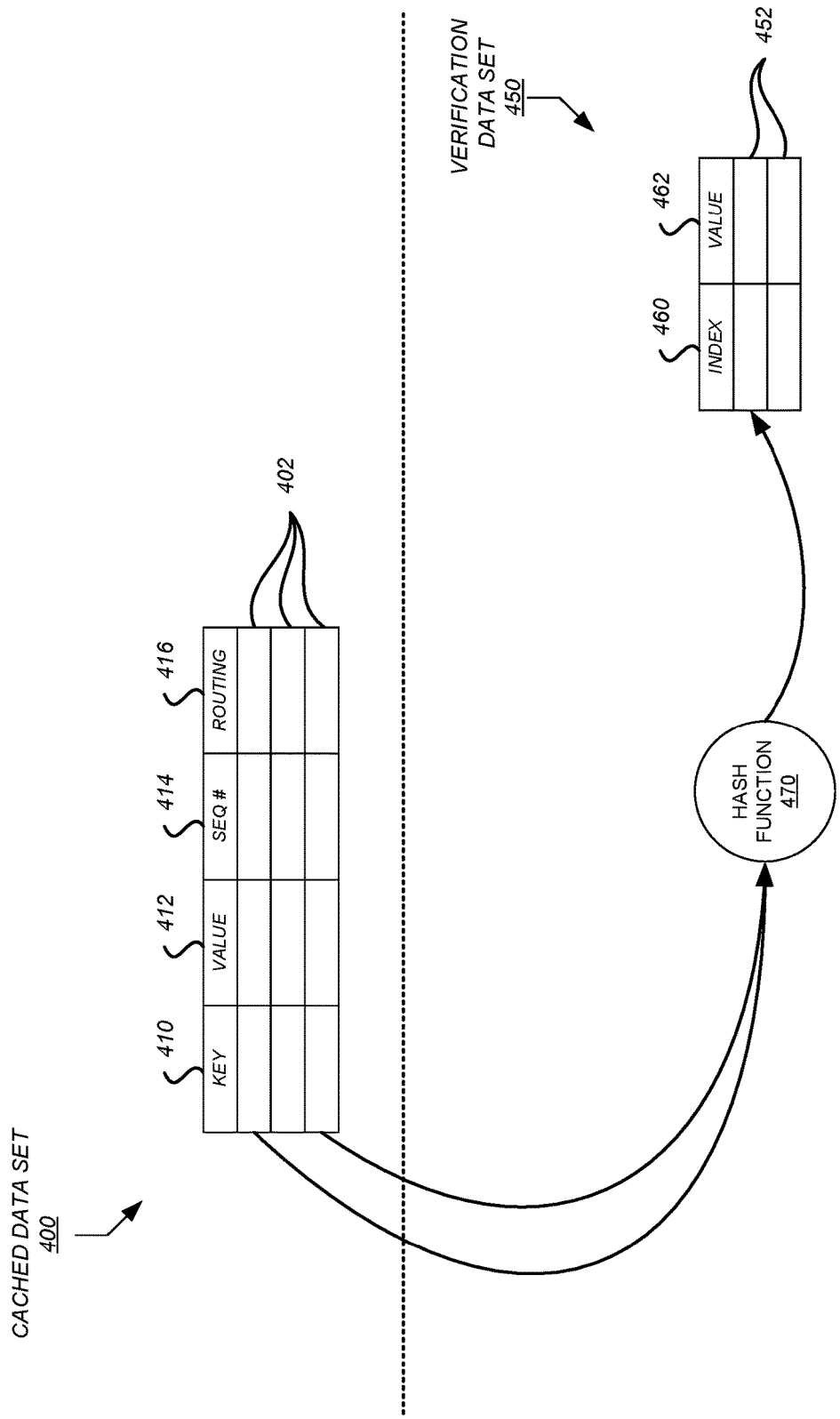
FIG. 4 is a diagram of illustrative cached data items and corresponding records of a witness service according to some embodiments.

FIG. 4 illustrates an example cached data set 400 of cached data items 402 that may be maintained by a cache node 202. Each cached data item 402 may include one or more fields. As shown, cached data items 402 may include a unique key 410, a value 412, a sequence number 414, and verification routing information 416.

Although many examples described herein use a sequence number such as a transaction sequencer to perform cache freshness verification queries and to implement other features for ensuring data consistency, the examples are illustrative only and are not intended to be limiting, required, or exhaustive. In some embodiments other forms of sequence data may be used to maintain data consistency, determine sequential update events associated with persistently-stored data and cached data, etc.

At block 308 of routine 300, the cache node 202 may obtain data from the witness service 116 for use in determining the freshness of the cached data item 402 for the key 410 that is the subject of the current request. Such data may be referred to as "freshness data." In some embodiments, the cache node 202 may access verification routing information 416 associated with the key 410 for the cached data item 402. The verification routing information 416 may identify a particular witness node 160 (or multiple witness nodes 160) to query. The query may be a query for the sequence number that is associated with the latest update event associated with the key 410.

FIG. 4 illustrates an example verification data set 450 of verification data items 452 that may be maintained by a witness node 160. Each verification data item 452 may include one or more fields. As shown, verification data items 452 may include a unique index 460 and a sequence number 462. The index 460 may correspond to a key (e.g., the key 410 of a cached data item 412). The value of the sequence number 462 field for a given verification data item 452 may be the sequence number assigned to the most recent update event associated with the index 460.

In some embodiments, the verification data set 450 may be implemented as a hash table. The witness node 160 may a set one or more hash functions 470 to hash keys and generate hash table indices. Due to the nature of hashing, use of a hash table introduces a degree of compression through hash collusions in which two or more keys 410 are mapped to the same index 460. The degree of compression may depend upon the particular hash function 470 being used and the number of individual verification data items 452 in the hash table.

Verification data set 450 compression may be desirable in order to keep the size of the hash table manageable (e.g., able to be maintained in random access memory of the witness node 160 for fast retrieval and low latency responses to freshness verification queries). Moreover, compression that results in hash collisions may not have negative effect from a data consistency standpoint, as long as the sequence numbers 462 associated with each data event are monotonically increasing. For example, if two keys 410 are mapped to the same index 460 by the hash function 470, then they will both be associated with the same verification data item 452 and queries for both keys will return the same sequence number 462. When an update event occurs for one key 410, the sequence number associated with that key will be used to update the data item 452 as described in greater detail below, and will become the sequence number that is associated with both keys 410. However, even though no recent update event may be associated with the other key 410, use of a later sequence number 462 will not impact data consistency because a cache invalidation will result in retrieval of the current value, which would be the same value prior to the update event for the other key.

At block 310 of routine 300, the cache node 202 may receive verification results from the witness service 116. The results may be or include the log sequence number 462 associated with the key 410 (e.g., via the index 460 generated using hash function 470).

In some embodiments, the cache node 202 may request and receive verification results from multiple witness nodes 160. The witness service 116 may include any number of witness nodes 160 for redundancy and/or quorum-based operations. To reduce the possibility of hash collisions involving the same keys occurring at each witness node 160, the witness nodes 160 may use different hash functions 470 to map keys to hash table indices.

In some embodiments, different subsets of witness nodes 160 may manage different subsets of the set of all keys available to be cached. For example, the set of all keys available to be cached may be too large to be maintained entirely in available memory of individual witness nodes 160. Additionally, or alternatively, the volume of cache freshness verification requests may be too great for individual witness nodes 160 to respond to such requests for all keys available to be cached. To address these issues, the set of all keys available to be cached may be partitioned into two or more partitions as described in greater detail below.

Figure 5:
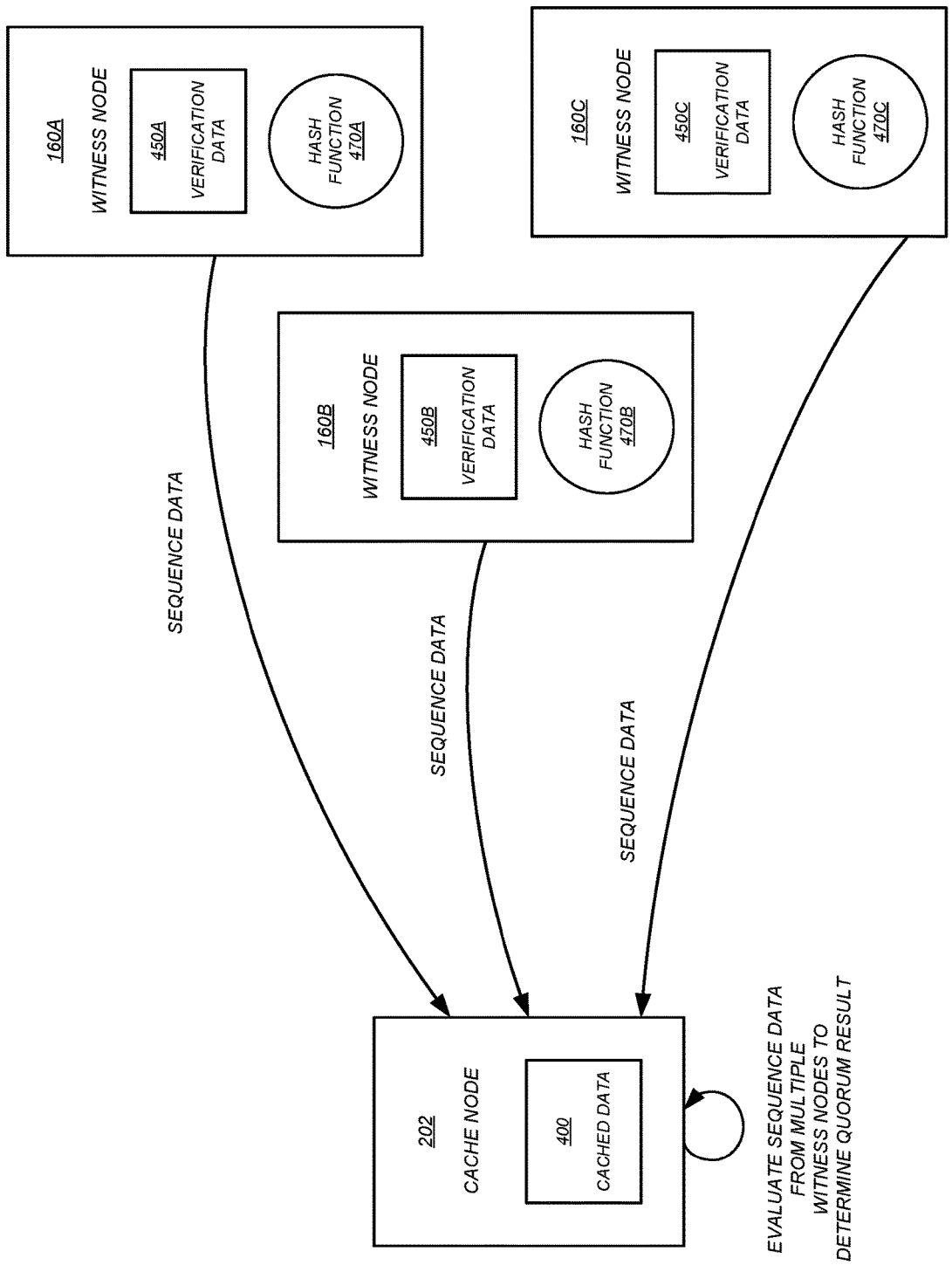
FIG. 5 is a block diagram showing illustrative data flows and interactions between a cache node and multiple nodes of the witness service according to some embodiments.

FIG. 5 illustrates a cache node 202 (e.g., the cache node 202 executing the current instance of routine 300) obtaining verification results from multiple witness nodes 160A, 160B, and 160C. The cache node 202 may use routing information 416 associated with the key 410 to make cache freshness verification requests to the appropriate witness node or subset of witness nodes. Each witness node 160A, 160B, 160C may include its own copy or version of verification data set 450A, 450B, 460C, respectively. When the verification data sets are implemented as hash tables, each witness node 160A, 160B, 160C may use a different set of one or more hash functions 470A, 470B, 470C, respectively.

At block 312, the cache node 202 may determine the sequence number for the latest update event associated with the key 310. If a single sequence number is requested and obtained for the key, then that sequence number may be used for subsequent portions of the routine 300. If multiple sequence numbers are requested and obtained for the key, the cache node 202 may select one for use in subsequent potions of the routine 300. The specific method used to select the sequence number from the multiple sequence numbers that have been received may depend on the reason the cache node is configured to obtain multiple verification results.

The cache node 202 may obtain verification results from multiple witness nodes for any of a variety of different reasons, such as for use in quorum operations.

In some embodiments, the cache node 202 may request verification results from multiple nodes, and use the results that are obtained first to proceed with the rest of the routine 300 and minimize latency.

In some embodiments, the cache node 202 may request verification results from multiple witness nodes, and use the greatest or latest sequence number received in verification results to proceed with the result of the routine 300. For example, when an update event occurs for a particular key, storage of the updated data may only be completed if at least a majority of the witness nodes are also updated with the sequence number associated with the update event (e.g., if there are 9 witness nodes for the current key, then at least 5 witness nodes must be updated). By obtaining verification results from at least a majority of the witness nodes (e.g., a quorum), the cache node 202 can be assured that it will receive verification results from at least one of the nodes updated in connection with the update event.

In some embodiments, an asymmetric quorum may be used in which the quantity or proportion of witness nodes queried for a given request may differ depending upon the type of request received. The different quantities/proportions may be selected so as to guarantee an overlap of one or more witness nodes. For example, the asymmetric quorum may be an asymmetric read/write quorum. When a request is received to write data, then sequence numbers may be obtained from a super majority of witness nodes (e.g., eight out of nine witness nodes assigned to the partition to which the requested key belongs) and/or the write may not be acknowledged until a super majority of witness nodes are updated with the new sequence number that corresponds to the write transaction. When a request is received to read data, then sequence numbers may be obtained from less than a majority of witness nodes, where the particular quantity of witness nodes in the sub-majority subset is selected to guarantee overlap with the write quorum (e.g., two out of nine witness nodes).

In some embodiments, the cache node 202 may request verification results from multiple witness nodes, and use the smallest or oldest sequence number that is nevertheless equal to or greater/later than a majority of the witness nodes. This process may be used to mitigate the effect of hash collisions at the witness nodes, such as in case where high degrees of compression are used. By using the sequence number that is equal to or greater/later than a majority of all sequence numbers maintained for the key, the cache node 202 can be assured that it is using a sequence number that is equal to or greater/later than the actual sequence number associated with the last update event for the key, even if there are one or more other sequence numbers in the verification results that are even greater/later than the selected sequence number. Those sequence numbers would be the result of hash collisions with other keys, and can be ignored to reduce the number of needless cache invalidation events.

At decision block 314, the cache node 202 may determine whether the sequence number of the cached data is less than the sequence number received from the witness service 116 (or less than the sequence number selected from the numbers received from multiple witness nodes, as described above). If so, then the cached data item may not include the most up-to-date value for the requested key and the routine 300 may proceed to block 316. Otherwise, if the sequence number of the cached data is not less than the sequence number received from the witness service 116 (or selected as described above), then the routine 300 may proceed to block 320.

At block 316, the cache node 202 may obtain updated data associated with the key from a persistent storage node.

At block 318, the cache node 202 may generate updated cached data associated with the key. In some embodiments, the cache node 202 may update one or more fields of the cached data item 402 associated with the key 410. For example, the cache node 202 may update the value 412 with the new value obtained from the persistent storage node 120. The cache node 202 may also update the sequence number 414 with a new sequence number. The new sequence number may be the number determined above based on verification results from the witness service 116, or it may be received from the persistent storage node 120 or some other service in connection with obtaining the updated value for the key.

At block 320, the cache node 202 may provide results back to the requestor. Illustratively, the results may be or include the value 412 currently assigned to the key 410 in the cached data item 402 associated with the key 410. In some embodiments, when a new value is obtained from a persistent storage node 120, block 320 may be performed prior to block 318. Thus, the value obtained from the persistent storage node may be provided back to the request prior to the cache node generating updated cached data associated with the key.

At block 322, the routine 300 may end.

Although routine 300 is described with respect to execution by a cache 202, the description is illustrative only and is not intended to be limiting, required, or exhaustive. In some embodiment, the routine 300 or portions thereof may be performed by any storage node to verify whether a stored data item is up to date, as described above with respect to FIG. 2.

Ensuring Monotonic Writes

Figure 6:
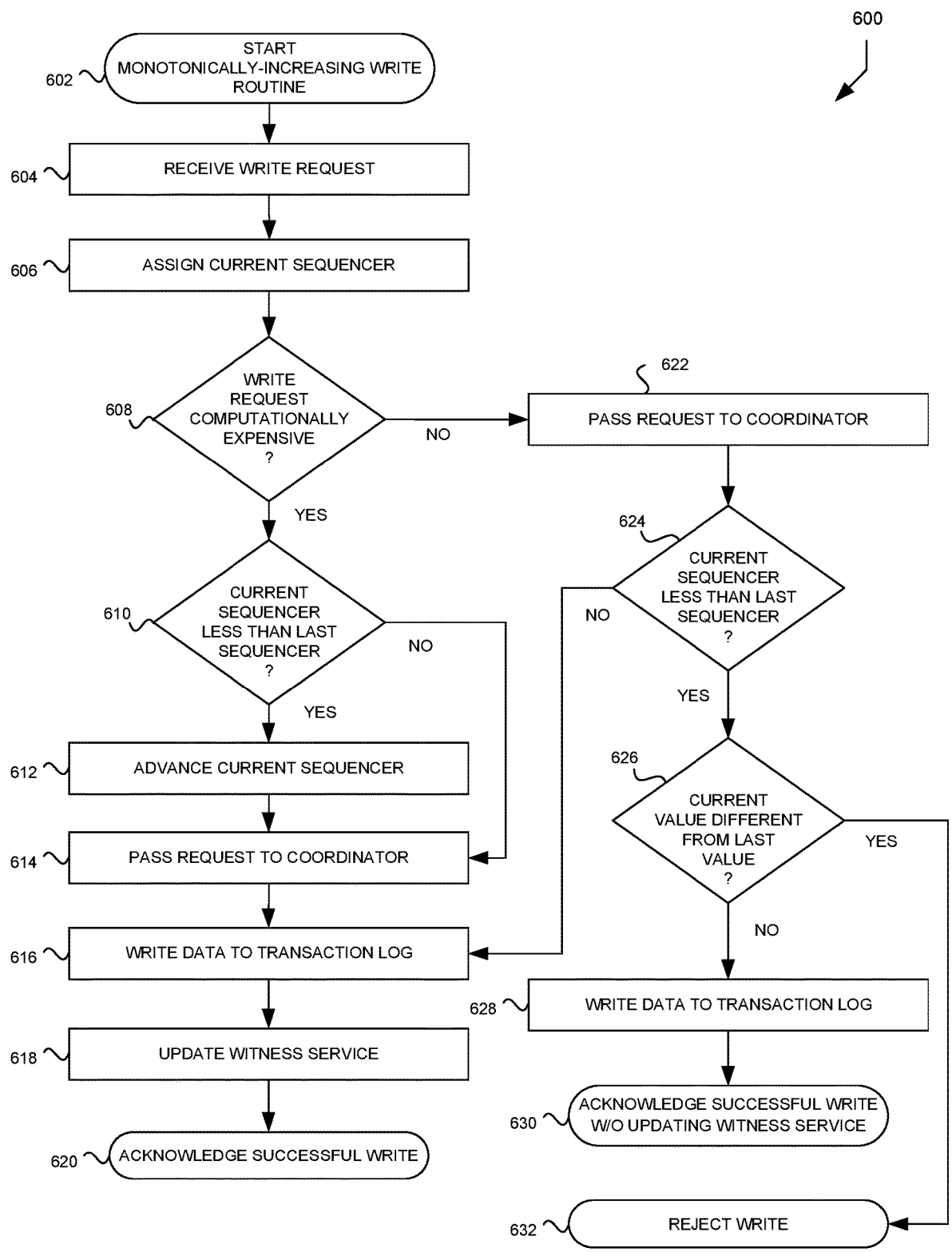
FIG. 6 is a flow diagram of an illustrative routine for storing data such that sequencers associated with data increase monotonically according to some embodiments.

FIG. 6 is a flow diagram of an illustrative routine 600 that may be executed by a distributed storage service 104 to ensure that data update events are applied or otherwise persisted in the proper sequence, even when originating from different nodes of the distributed storage service 104. Advantageously, ensuring monotonic writes using the routine 600 helps to ensure data consistency among caches of the persistent data, such that stale data is less likely to be accessed.

Although the description that follows is with respect to an example implementation in which the routine 600 is performed by the distributed storage system 104 shown in FIG. 1, including an index service 112, the example is for purposes of illustration only and is not intended to be limiting. In some embodiments, the routine 600 may be used in other environments and to manage other types of data. Aspects of the routine 600 will be described with further reference to the illustrative data flows and interactions shown in FIGS. 7 and 8.

The routine 600 may begin at block 602 in response to an event, such as when the index service 112 begins operation. When the routine 600 is initiated, a set of executable program instructions stored on one or more non-transitory computer-readable media (e.g., hard drive, flash memory, removable media, etc.) may be loaded into memory (e.g., random access memory or "RAM") of a computing device and executed. In some embodiments, the routine 600 or portions thereof may be implemented on multiple processors, serially or in parallel.

At block 604, the distributed storage system 104 may receive a write request to store data. In some embodiments, the request may be a request to change or otherwise store data associated with a particular key. For example, the request may be a PUT request, and may include the key and the data to be written. The request may be initiated by a client 102 or some other device or system, and may be received by a frontend node 110.

At block 606, the frontend node 110 or some other component of the distributed storage system 104 may assign a sequence number to the request. In some embodiments, the sequence number may be based on a system clock of the frontend node 110. For example, the frontend node 110 may include a system clock that provides a monotonically-increasing value from a particular point in time, such as the number of nanoseconds that have passed since a particular point in time. The frontend node may use this output from the system clock as the sequence number, or may otherwise derive the sequence number from the output of the system clock (e.g., by subtracting a particular value to reduce the magnitude of the sequence number and consume less memory). Sequence numbers based on the system clock can thus be compared to find out which sequence number corresponds to a later point in time based on which sequence number is greater.

At decision block 608, the frontend node 110 can determine whether to pass the write request to another subsystem, or to perform additional operations first. The decision may be made based on type of write requests, where there are multiple different write request types. In some embodiments, a write request type is based on the complexity of the write request (e.g., how computationally expensive the write request is), which can have an effect on costs of rejecting the write request. For example, if the write request is a complex write request, such as a multi-phase request, then the cost of rejecting the request in terms of time and computing resources consumed by the client 102 to re-submit the request or otherwise address the rejection may be relatively high compared to rejecting non-complex write requests, such as single part requests. The frontend node 110 may therefore perform additional processing in order to avoid a rejection of such complex requests, and the routine 600 may proceed to block 610. Other types of requests, such as single-phase requests, may be less complex and/or less computationally expensive in terms of time and computing resources consumed by the client 102 to re-submit the request or otherwise address a rejection. Moreover, performing additional processing up front for each of such requests may introduce additional latency and/or other computational expenses that are unexpected or undesirable. For these types of requests, or if the frontend node 110 otherwise determines to pass the write request to another subsystem for the next operations in the request path, the routine 600 may proceed to block 620.

At decision block 610, the frontend node 110 can determine whether the current sequence number generated above is greater than the last sequence number for the key. The frontend node 110 can obtain the latest sequence number for the key from the persistent data store and/or the transaction log. If current sequence number is not greater than the last sequence number for the key, then the routine 600 may proceed to block 612. Otherwise, if the current sequence is greater than last sequence number for the key, then the routine 600 may proceed to block 614.

In some cases, the current sequence number may not be greater than the last sequence number for the key due to a difference in system clocks among different frontends 110. Due to the nature of the distributed system, different write requests for a given key may be handled by different frontends 110. Although the system clocks among the frontends 110 may be substantially synchronized, there may nevertheless be a slight skew in the time kept by different system clocks of different frontend nodes 110. Thus, if two write requests are submitted for the same key in a very short period of time (e.g., write requests from two different clients 102, or from two different threads of a single client 102), then even a slight clock skew may result in a later-arriving request being assigned a sequence number that is prior to the sequence number assigned to a prior-arriving request.

At block 612, in response to determining that the current sequence number is not greater than the last sequence number, the frontend node 110 may modify the current sequence number such that it is greater than the than the last sequence number. Thus, the write request may proceed using the modified sequence number, and monotonic increase of the sequence number may be maintained.

At block 614, the frontend node 110 may pass the write request with the modified sequence data to the coordinator subsystem 124 for further processing. At block 616, the write request may be made to the transaction log to persist the data associated with the key and the current sequence number. At block 616, the coordinator subsystem 124 can send a message to the witness service 116 regarding the new sequence number associated with the key. At block 618, the coordinator subsystem 124 can update the witness service 116 with the new sequence number. At block 620, the current instance of the routine 600 may end with the coordinator system 124 acknowledging successful completion of the write request to the source of the request.

Figure 7:
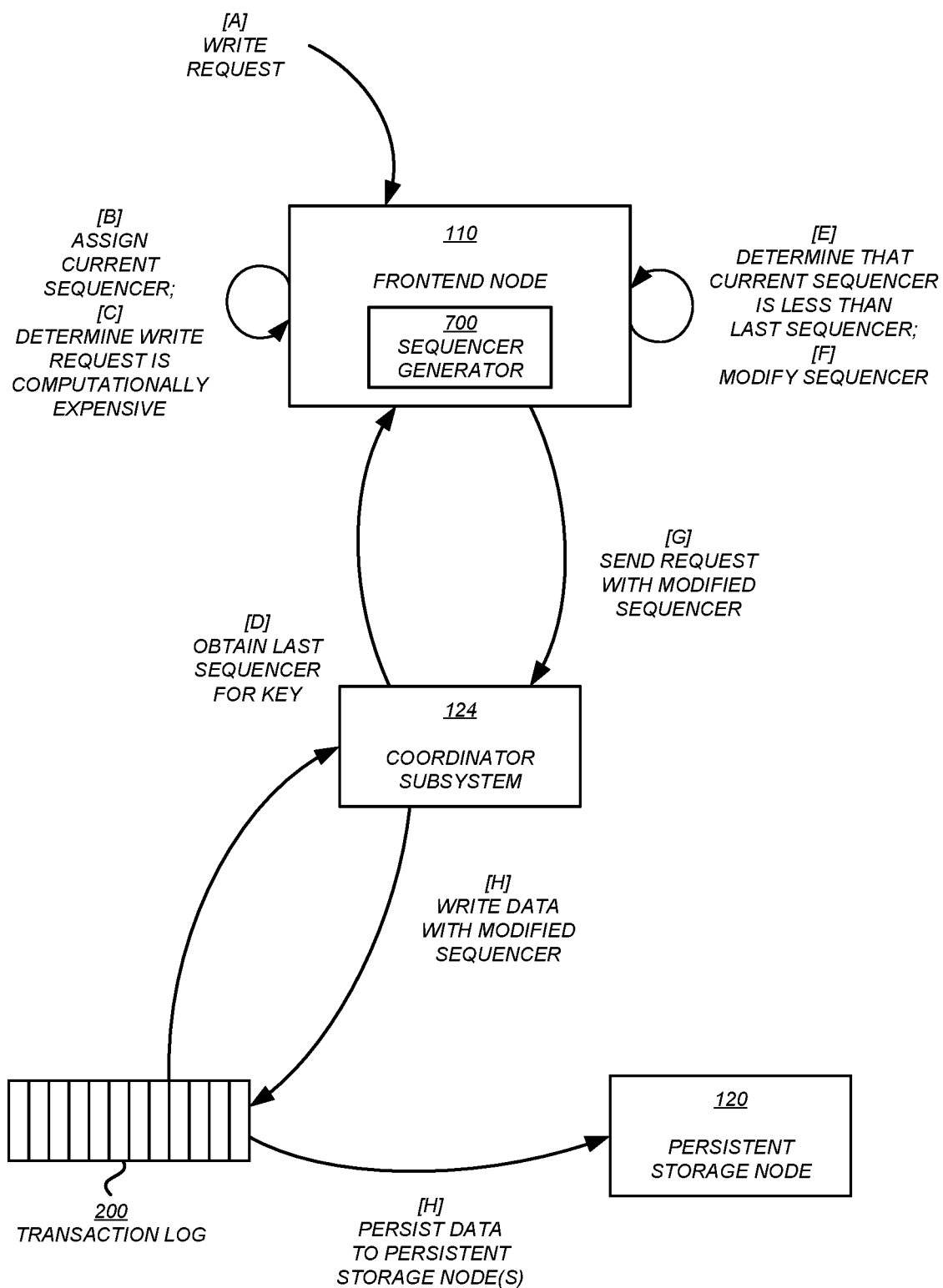
FIG. 7 is a block diagram of illustrative data flows and interactions between components of a caching index service to ensure monotonic increase of sequencers during storage of data according to some embodiments.

FIG. 7 illustrates example data flows and interactions between components of the distributed storage system 104 of FIG. 1 when handling a complex write request for a key and determining that a current sequence number is not greater than the last sequence number associated with the key.

As shown, a write request is received by a frontend node 110 at [A]. The frontend node 110 uses a sequencer generated 700 to assign a sequence number to the write request at [B]. At [C], the frontend node 110 determines that the write request is a complex request, and the frontend node 110 is to perform additional processing prior to sending the request to another subsystem for the next operation(s) in the request path.

At [D], the frontend node 110 can obtain the last sequence number associated with the key. For example, the frontend node 110 may obtain the last sequence number from a subsystem that manages the transaction log 200, such as a coordinator subsystem 124. The coordinator subsystem 124 may inspect the transaction log 200, identify the last sequence number associated with the key, and provide the last sequence number to the frontend node 110.

At [E], the frontend node 110 can determine that the current sequence number, assigned at [B], is not greater than the latest sequence number associated with the key and received from the coordinator subsystem 124. At [F], the frontend node 110 can modify the current sequence number, and submit the write request with the modified sequence number to the coordinator subsystem 124 at [G]. The coordinator subsystem 124 can write the key, data, and modified sequence number to the transaction log 200 at [H], from where it will be persisted to one or more persistent storage nodes 120 at [I].

Returning to FIG. 6, an alternate request path will be described. At block 622, the frontend node 110 passes the write request to another subsystem for performing the next operation(s) in the request path (e.g., based on the write request being a non-complex write request).

At decision block 624, the coordinator subsystem 124 can determine whether the current sequence number is greater than the last sequence number associated with the key. If so, the routine 600 can proceed to block 616, where the write request may be made to the transaction log to persist the data associated with the key and the current transaction number. Otherwise, if the current sequence number is not greater than the last sequence number associated with the key, then the routine 600 can proceed to decision block 626.

At decision block 626, the coordinator subsystem 124 can determine whether the value associated with the last sequence number is the same as the value of the current write request. If so, then the routine 600 may in some embodiments proceed to block 630, where data is written to the transaction log 200, and then to block 632, where the current instance of the routine 600 terminates with the coordinator subsystem 124 acknowledging success of the write request without sending an update to the witness service 116. In some embodiments, data may be written to the transaction log 200 in the same manner as other write requests described herein, even though the current sequence number is less than the last sequence number. This may be done so that other services that use the transaction log 200, such as the event notification service 1200 described in greater detail below, may obtain information regarding the acknowledged write operation. In some embodiments, additional data may be included, such as a tag or metadata indicating that the data is only written to the transaction log without any corresponding write to a persistent storage node 120 and/or without any update to the witness service.

Otherwise, if the value associated with the last sequence number is different than the value associated with the current sequence number, then the routine 600 may terminate at block 632 where the write request is rejected.

Figure 8:
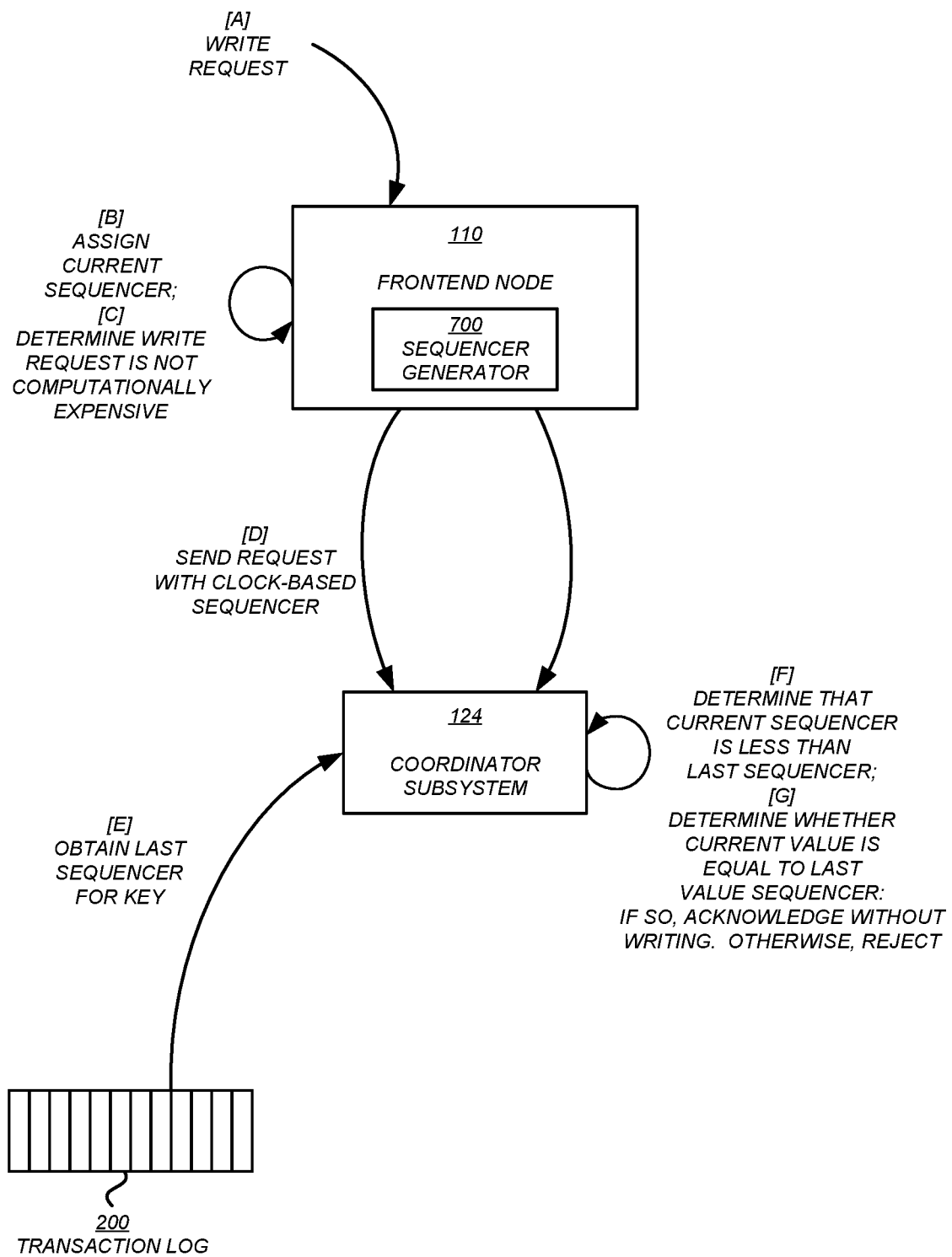
FIG. 8 is a block diagram of illustrative data flows and interactions between components of a caching index service to ensure monotonic increase of sequencers during storage of data according to some embodiments.

FIG. 8 illustrates example data flows and interactions between components of the distributed storage system 104 of FIG. 1 when handling a non-complex write request for a key and determining that a current sequence number is not greater than the last sequence number associated with the key.

As shown, a write request is received by a frontend node 110 at [A]. The frontend node 110 assigns a sequence number to the write request at [B]. At [C], the frontend node 110 determines that the write request is a non-complex request, and the frontend node 110 sends the request to another subsystem (e.g., the coordinator subsystem 124) for the next operations in the request path at [D]

At [E], the coordinator subsystem 124 can obtain the last sequence number and value associated with the key. For example, the frontend node 110 may obtain the last sequence number and value from the transaction log 200. At [F], the coordinator subsystem 124 can determine that the current sequence number, assigned at [B], is not greater than the latest sequence number associated with the key and received from the transaction log 200.

At [G], the coordinator subsystem 124 can determine whether the value associated with the current request is different than the value associated with the last sequence number. If the values are the same, then a subsequent data accessor will not be able to determine whether the value is from the current write request, or from a prior write request associated with the key. Thus, successful completion of the write request can be acknowledged without actually completing the write request (e.g., without writing the current sequence number to the transaction log, thereby violating the goal of monotonically increasing sequence numbers associated with the key). By acknowledging successful completion of the write request, the source of the write request will not be triggered to retry the write request, which would not change the value assigned to the key.

Alternatively, if the values are different, then the coordinator subsystem 124 can reject the write request. Because the write request was a non-complex write request, the cost for the source of the write request to retry the write request is not as high as a complex write request.

Ensuring Monotonic Reads

Figure 9:
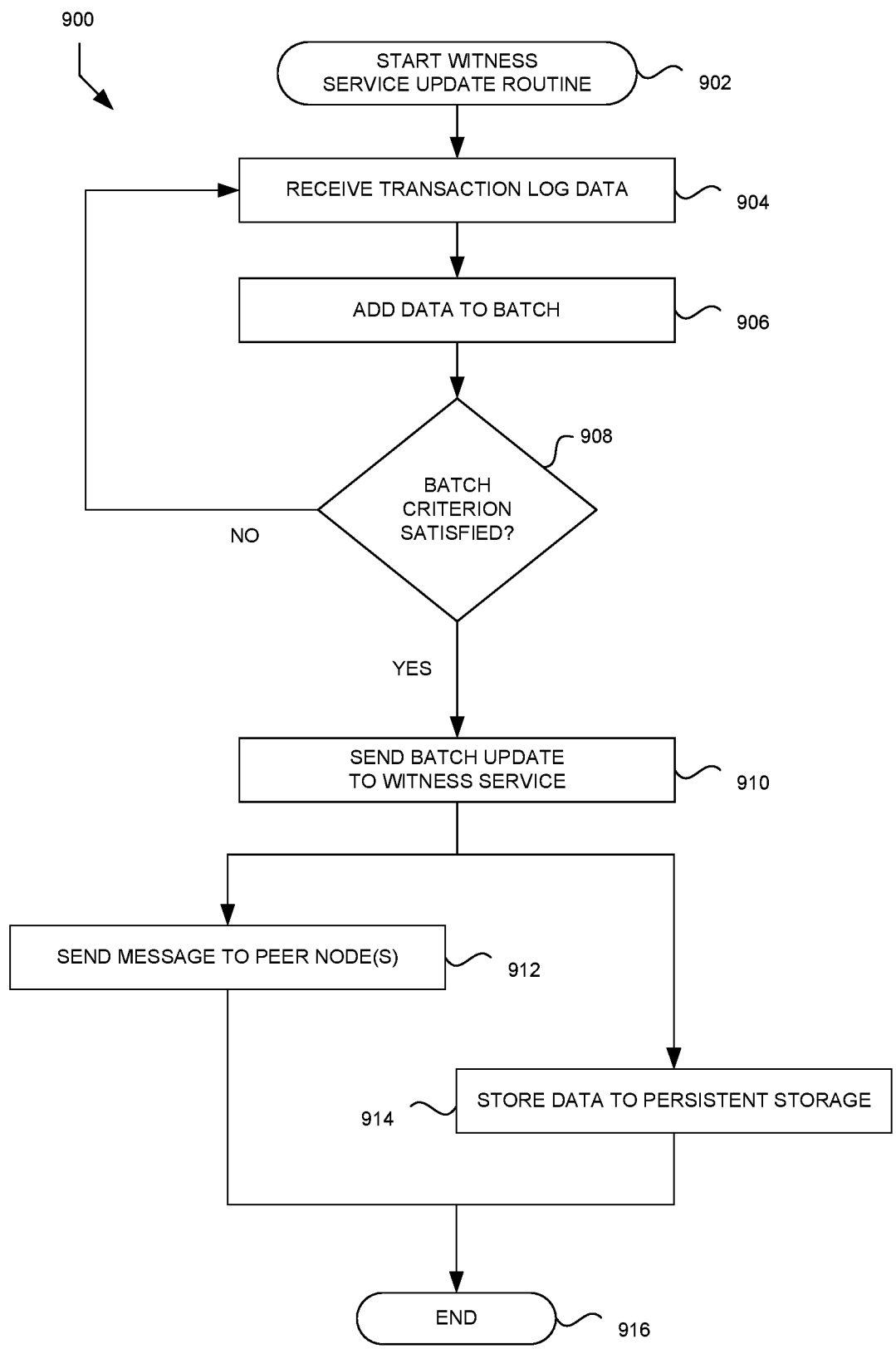
FIG. 9 is a flow diagram of an illustrative routine for persistent storage of data across a set of persistent storage nodes such that subsequent read requests return the most recent version of requested data regardless of the node to which the read requests are routed according to some embodiments.

FIG. 9 is a flow diagram of an illustrative routine 900 that may be executed by a persistent storage node to update the witness service as part of the process of persisting data from the transaction log to persistent storage. Advantageously, updating the witness service as part of the process of persisting the data to persistent storage can help to further ensure that the witness service can provide the latest sequence numbers to cache nodes, even if an update to the witness service during the original write request path processing to the transaction log fails for some reason. Moreover, to reduce the amount of additional network traffic and witness service processing that would result from multiple persistent storage nodes updating the witness service for each data update event (e.g., due to replication of data across multiple nodes), a batching and/or messaging protocol may be implemented.

Although the description that follows is with respect to an example implementation in which the routine 900 is performed in the context of the distributed storage system 104 shown in FIG. 1, including an index service 112, the example is for purposes of illustration only and is not intended to be limiting. In some embodiments, the routine 900 may be used in other environments and to manage other types of data. Aspects of the routine 900 will be described with further reference to the illustrative data flows and interactions shown in FIGS. 10 and 11.

The routine 900 may begin at block 902 in response to an event, such as when a persistent storage node 120 begins operation. When the routine 900 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 900 or portions thereof may be implemented on multiple processors, serially or in parallel.

At block 904, a persistent storage node 120 may receive data from the transaction log 200 to be persisted in persistent storage. In some embodiments, the persistent storage node 120 may include or be associated with a component that manages persistent storage of data from the transaction log 200 to the persistent storage node. For example, the coordinator subsystem 124 may provide records from the transaction log 200 to one or more persistent storage nodes 120 for storage. As another example, an applier component that is part of the persistent storage node 120 or otherwise separate from the coordinator subsystem 124 and associated with a persistent storage node 120 may manage obtaining records from the transaction log 200 for storage in the persistent storage node 120.

At block 906, the persistent storage node 120 can in some embodiments add the current transaction log record to a batch of records. The persistent storage node 120 may maintain transaction log records in a batch until a batch update criterion is satisfied, at which time the persistent storage node 120 may write data from the batched transaction log records to persistent storage (e.g., a high density magnetic disk drive, a solid state drive, etc. of the persistent storage node 120). For example, the persistent storage node 120 may maintain the transaction log records, or data derived therefrom, in memory until the persistent storage write operation is to be performed.

At decision block 908, the persistent storage node 120 can determine whether a batch update criterion has been satisfied. The batch update criterion may relate to a variety of different events and/or properties of the batch, as described in greater detail below. If the batch update criterion is satisfied, the routine 900 may proceed to block 910. Otherwise, if the batch update criterion has not been satisfied, the routine 900 may return to block 904 for possible receipt of another transaction log record. In some embodiments, the routine 900 may also or alternatively wait until the batch update criterion has been satisfied. For example, a batch update criterion analysis thread may sleep and periodically wake up to determine whether the batch update criterion has been satisfied. As another example, an event-based model may be implemented in which certain events trigger evaluation of the batch update criterion even if other portions of the routine 900 are being executed.

In some embodiments, the batch update criterion may relate to a maximum threshold for the quantity of log records (or data derived therefrom) permitted to be maintained in the batch. If the quantity satisfies the threshold (e.g., meets or exceeds the threshold), then the batch update criterion may be satisfied and the routine 900 may proceed to block 910.

In some embodiments, the batch update criterion may relate to a maximum period of time that a batch may be maintained before being written. For example, when a first transaction log record is received after a prior batch update operation, then a new batch may be created and the time of creation may be recorded. There may be a maximum threshold period of time specified in a quantity of time units (e.g., n milliseconds) that the batch or any individual transaction log record of the batch may be maintained in memory before being written to persistent storage. If the quantity satisfies the threshold (e.g., meets or exceeds the threshold), then the batch update criterion may be satisfied and the routine 900 may proceed to block 910.

In some embodiments, the batch update criterion may relate to receipt of a request to access data in the batch. For example, the persistent storage node 120 may receive a read request (e.g., a GET request) for a particular key or otherwise for data that is associated with a sequence number. The persistent storage node 120 may check whether data associated with that key and/or sequence number is currently in a batch waiting to be written to persistent storage. If so, the batch update criterion may be satisfied and the routine 900 may proceed to block 910. Thus, data accessors are not required to wait for some other batch update criterion to be satisfied before they access their data.

In some embodiments, multiple batch update criteria may be evaluated, conjunctively or disjunctively. For example, a persistent storage node may evaluate multiple criteria during a single execution of decision block 908: if the threshold quantity of records has been satisfied, or if the threshold period of time has been satisfied (or if both have been satisfied), then the routine 900 may proceed to block 910. As another example, the two thresholds may be evaluated each time decision block 908 is reached from block 906, and a request-related criterion may be evaluated on an event-driven basis as indicated by the dotted arrow from block 902 and the dotted circular arrow at decision block 908. The examples of batch update criteria and evaluations described herein are illustrative only, and are not intended to be limiting, required, or exhaustive. In some embodiments, additional, fewer, and/or alternative batch update criteria and methods of evaluation may be used.

At block 910, the persistent storage node 120 can send a batch witness service update message to the witness service 116. In some embodiments, the batch witness service update message may include a listing of all keys and corresponding sequence numbers included in the current batch. The witness service 116 may apply the updated sequence numbers to its verification data set 350. For example, if the verification data set 350 is implemented as a hash table, the witness service 116 may generate hashes of each key, and use the hashes as indices 360 to access the appropriate verification data items 352 and update the corresponding sequence numbers 362. If the witness service 116 includes multiple witness nodes 160, then each node that is associated with the keys in the batch witness service update message (or a subset thereof) may update its verification data set 350 accordingly.

Figure 10:
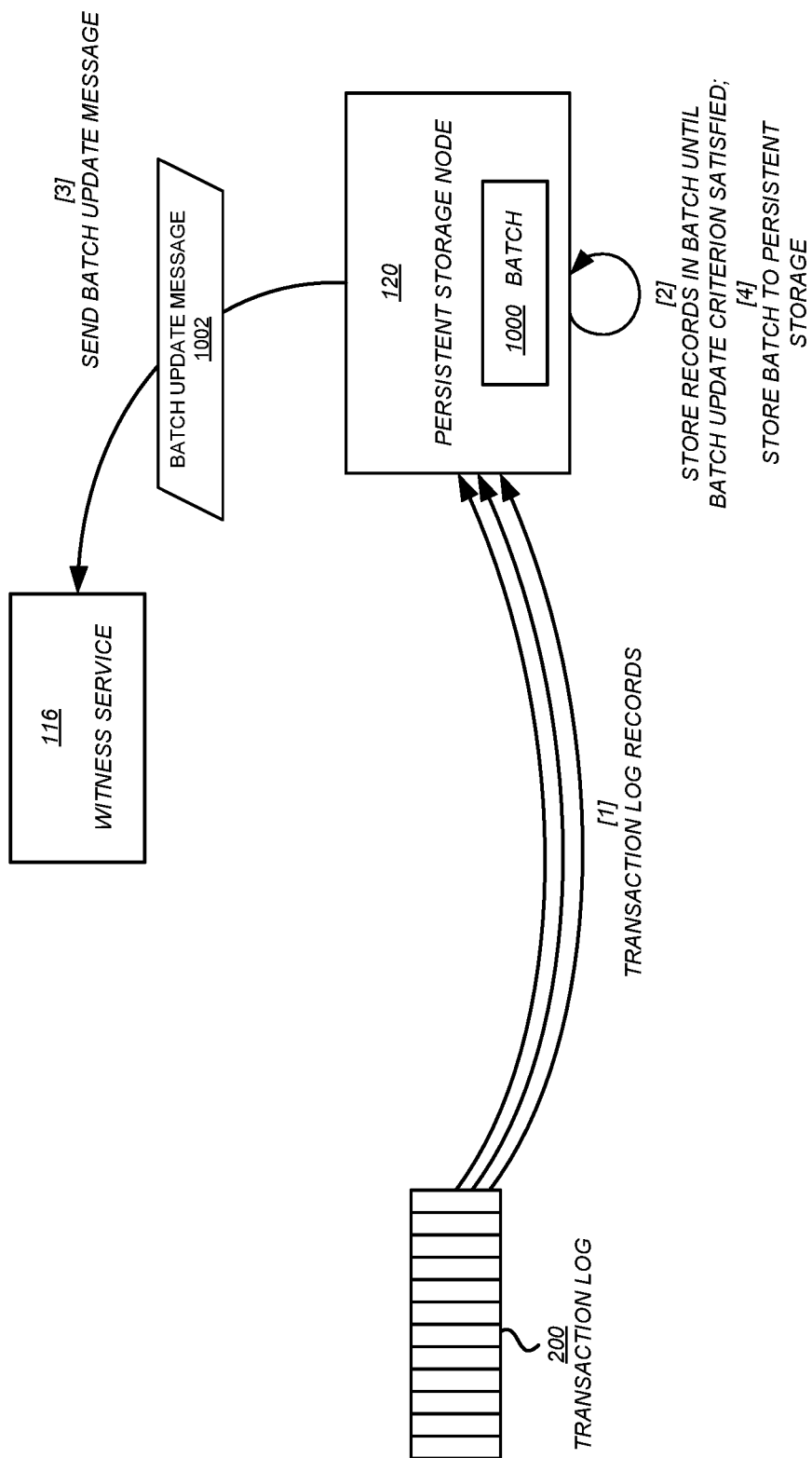
FIG. 10 is a block diagram of illustrative data flows and interactions between components of a distributed storage system to ensure that a future read request returns the most recent version of requested data regardless of which node in the distributed storage system is servicing the request according to some embodiments.

FIG. 10 illustrates an example in which a persistent storage node 120 batches transaction log records (or data derived therefrom) for a batch witness service update message. As shown, the persistent storage node 120 receives records from the transaction log 200 at [1]. The persistent storage node 120 can maintain a batch 1000 of the incoming transaction log records at [2] until one or more batch update criteria are satisfied. When the one or more batch update criteria are satisfied, the persistent storage node 120 can send a batch witness service update message 1002 to the witness service 116 at [3]. Upon successful receipt by the witness service 116 (e.g., via an acknowledgment from the witness service 116), the persistent storage node 120 can proceed with persistent storage of data from the batched transaction log records at [4], as described below.

At block 912, the persistent storage node 120 can send a message to one or more other persistent storage nodes regarding the witness service update message that was sent to the witness service 116. The message can be a notification to the other persistent storage node(s) that the witness service 116 has already been updated with the sequence numbers included in the witness service update message, and the other persistent storage nodes do not need to also update the witness service regarding those keys and sequence numbers when performing their own instances and iterations of routine 900. In this way, traffic from the persistent storage nodes 120 to the witness service 116, and processing at the witness service 116, can be reduced while still obtaining the benefit of an update at the time of persistent storage, even if that update is a secondary confirmatory update.

In some embodiments, the persistent storage node 120 executing the current instance of routine 900 may maintain a list of the all keys with data update events which the persistent storage node 120 has updated the witness service 116, and the sequence number before which all data update events have been updated to the witness service 116. The persistent storage node 120 may generate the message to one or more other persistent storage nodes using the maintained list. For example, the message may comprise a "best effort" signal that includes the sequence number before which all data update events have been updated to the witness service 116. A recipient of the message may then determine to exclude any such key and/or sequence number from its own witness service update message. Accordingly, the frequency of communications and volume of duplicative information sent to the witness service 116 may be reduced, in some cases substantially.

In some embodiments, the message that the persistent storage node 120 sends to other persistent storage nodes may be a notification broadcast to each other persistent storage node of the distributed storage system 104, or each other persistent storage node associated with a given key or set of keys (e.g., when the set of persistent storage nodes 120 are partitioned as described in greater detail below). In some embodiments, peer-to-peer messages may be sent using a gossip protocol in which a persistent storage node sends a gossip message to one or more predetermined or dynamically-determined persistent storage nodes, those nodes forward the gossip message to one or more other predetermined or dynamically-determined persistent storage nodes, and so on until all nodes have received the gossip message.

At block 914, the persistent storage node can store data from the batch to persistent storage. The routine 900 may terminate at block 916.

Figure 11:
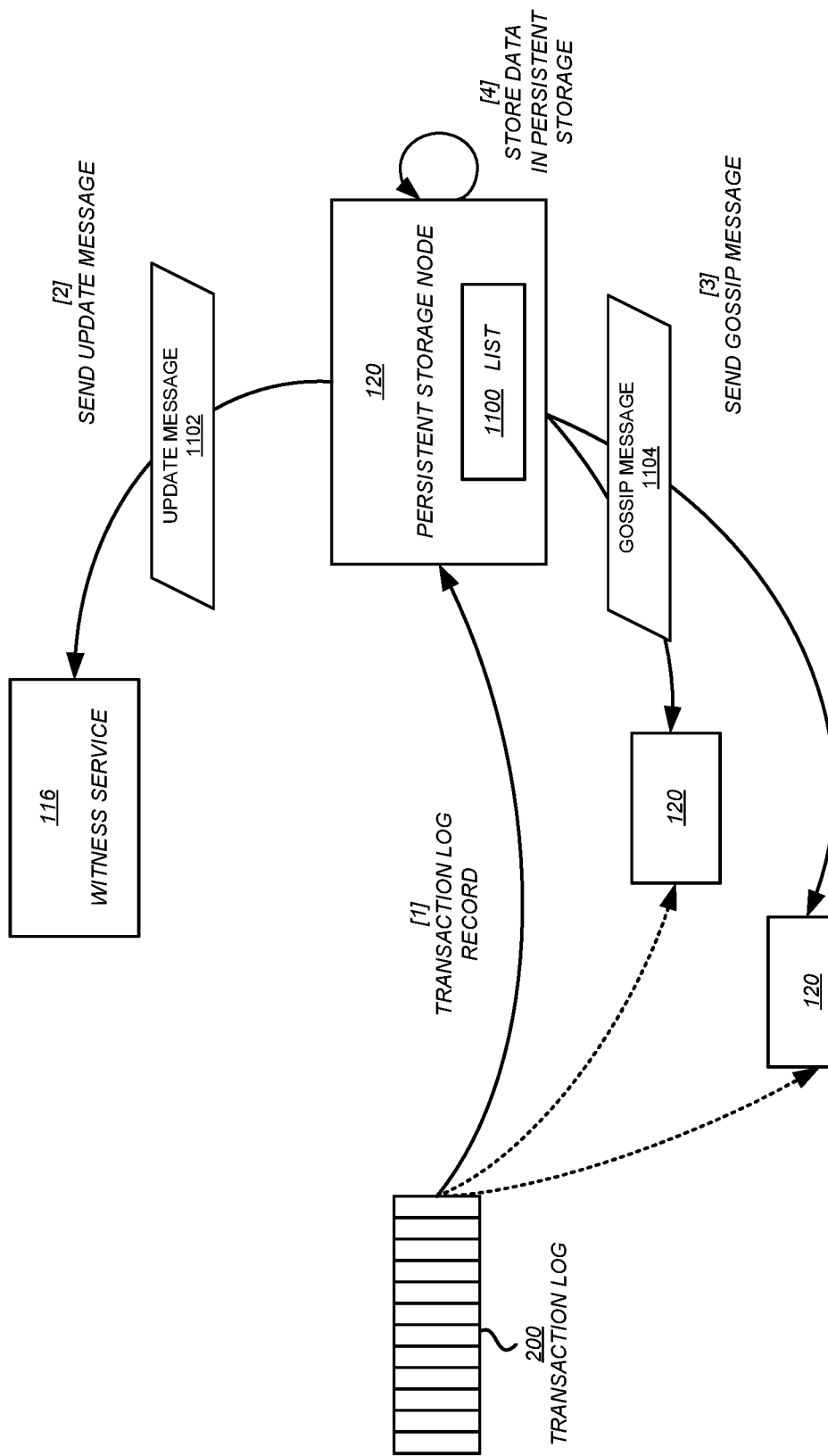
FIG. 11 is a block diagram of illustrative data flows and interactions between components of a distributed storage system to ensure that a future read request returns the most recent version of requested data regardless of which node in the distributed storage system is servicing the request according to some embodiments.

FIG. 11 illustrates an example in which a persistent storage node 120 sends notifications, such as gossip messages, to other persistent storage nodes regarding a witness service update message sent to the witness service 116. As shown, the persistent storage node 120 receives a record from the transaction log 200 at [1]. The persistent storage node 120 can update the witness service 116 at [2] by sending a witness service update message 1102. In addition, the persistent storage node 120 can maintain a list 1100 of keys that have been verified to the to the witness service 116, and the sequence number before which all keys have been verified. Upon successful receipt by the witness service 116 of the witness service update message 1102 (e.g., via an acknowledgment from the witness service 116), the persistent storage node 120 can proceed with using the list 1100 to generate and send a gossip message 1104 to one or more other persistent storage nodes at [3]. Prior to, in parallel with, or subsequent to sending the gossip messages 1104, the persistent storage node 120 can proceed with persistent storage of data from the transaction log records at [4].

Figure 12:
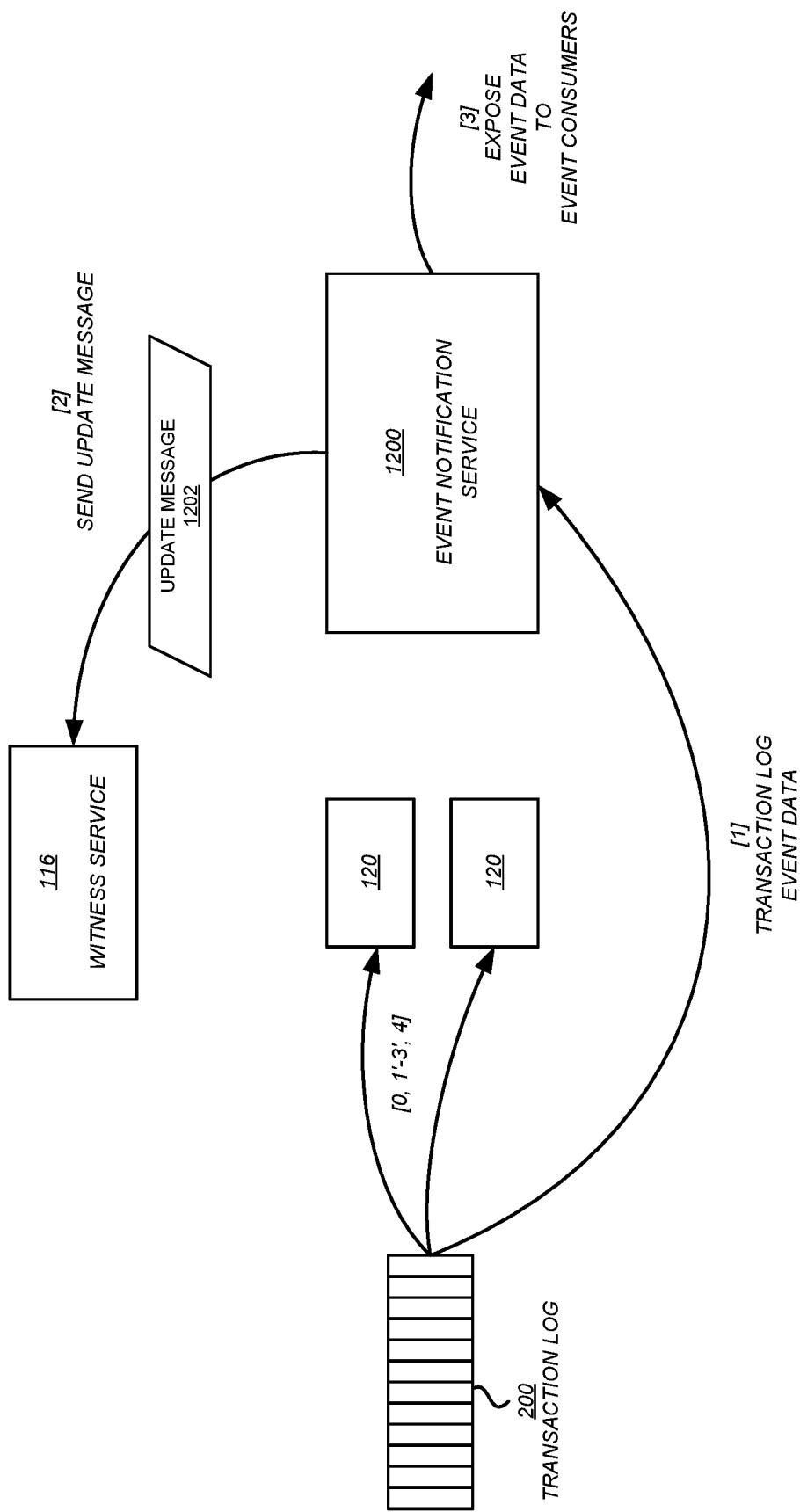
FIG. 12 is a block diagram of illustrative data flows and interactions between components of a distributed storage system including an event notification system according to some embodiments.

In some embodiments, an additional service may consume data update event data from the transaction log 200 and expose the data to consumers. This service may provide an additional opportunity to update the witness service 116. In some cases, such a service may be able to update the witness service 116 more quickly than the persistent storage nodes 120. FIG. 12 illustrates an example of an event notification service 1200 that provides information to consumers about data update events that have been written to the transaction log 200. As shown, the event notification service 1200 is separate from the persistent storage nodes 120, and operates independently of any persistent storage operations, witness service update messaging, gossip messaging, etc. performed by the persistent storage nodes 120. At [1], the event notification service 1200 obtains event data 1202 from the transaction log 200. The event data 1202 may be received on an event-by-event basis (e.g., one message per event), or as a batch (e.g., a message comprising event data for n events). To ensure that consumers of event notifications can access the data that is the subject of the events, the event notification service 1200 can send a witness service update message 1202 to the witness service 116 at [2] prior to sending event notifications to consumers or otherwise exposing event information at [3]. This witness service update message 1202 from the event notification service 1200 can help to ensure data consistency for read requests in cases where the event notification service 1200 provides event notifications prior to any persistent storage node 120 having updated the witness service 116 and persistently stored data regarding the event. As indicated by the label [0, 1'-3', 4], the persistent storage nodes 120 may obtain transaction log data, generate witness service update messages and gossip messages, and persistently store data at any time before, during, or after the illustrated operations of the event notification service 1200.

Multi-Tier Caching Architecture

Figure 13A:
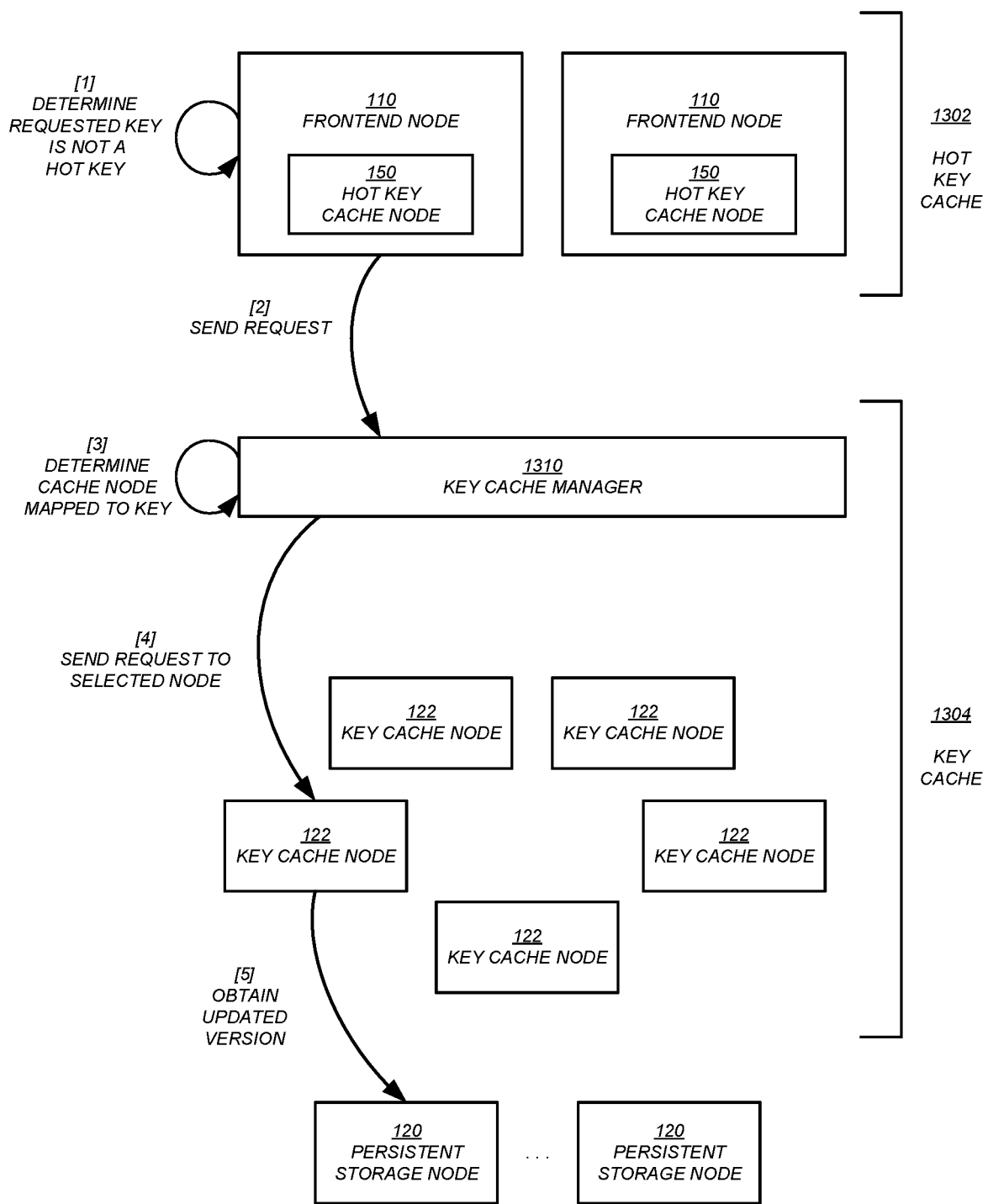
FIG. 13A is a block diagram of illustrative data flows and interactions between components of multi-level cache architecture according to some embodiments.

FIG. 13A is a block diagram of an illustrative multi-tier caching architecture. In some embodiments, shown, the multi-tier caching architecture includes a first tier 1302 for caching the most frequently requested objects, and a second tier 1304 for caching other objects. The first tier 1302 may be referred to as a hot key cache, and the second tier 1304 may be referred to as a key cache.

In some embodiments, the key cache 1304 may be implemented using multiple key cache nodes 122 configured as a consistent hash ring. In the consistent hash ring, each key cache node 122 may be mapped to a set of keys using a hash function such that a contiguous portion of the key space, corresponding to data items that are related and often requested close in time with each other, is distributed among multiple nodes. For example, each data item of the distributed storage system 104 may be assigned a unique key, as described above. Illustratively, the keys may be hexadecimal numbers represented by strings of hexadecimal symbols (e.g., numerals 0-9 and letters a-f, where "a" represents a value of 10, "b" represents a value of 11, and so on up to "f" which represents a value of 15). Keys for objects used by the same client 102 or associated with the same workload may be similar, such as being assigned contiguous or substantially contiguous keys. In the consistent hash ring configuration, requests for a given key will be mapped to the same cache node from request to request, in some cases without regard to the passage of time between requests. Thus, distributing keys in contiguous portions of the key space among multiple nodes serves as a load balancing mechanism.

The hot key cache 1302 may be implemented using a randomized load balancing mechanism such that requests for a given hot key will be mapped to different hot key cache nodes 150 from request-to-request in order to balance the load for that specific hot key. For example, the hot key cache 1302 may include the frontend nodes 110 that initially evaluate requests to determine whether they are for hot keys. When a request is received by the distributed storage system 104, it may initially be assigned to frontend node 110 by a load balancer (e.g., on a randomized basis). If a request is for a hot key, the frontend node 110 may attempt to service the request from its hot key cache node 150. Otherwise, the request may be passed to the key cache 1304.

As shown in FIG. 13A, when a frontend node 110 determines at [1] that the key of a requested data object is not one of a set of hot keys, then the request may be passed to the key cache 1304 at [2]. At [3], a management subsystem such as a key cache manager 1310 may determine the proper key cache node 122 to which the request is to be routed. For example, the key cache manager 1310 may evaluate a hash function or use some other mapping technique to determine the particular key cache node 122 of the set of key cache nodes in the key cache 1304 to which the key of the currently-requested data object is assigned. The key cache manager 1310 may forward the request to the assigned key cache node 122 at [4]. The key cache node 122 may then service the request by determining whether a cached version of the requested data object is available and valid, obtaining an up-to-date version from a persistent storage node 120 at [5] if needed, etc. For example, the key cache node 122 may perform some or all of the operations shown in FIG. 2 and described in greater detail above.

Figure 13B:
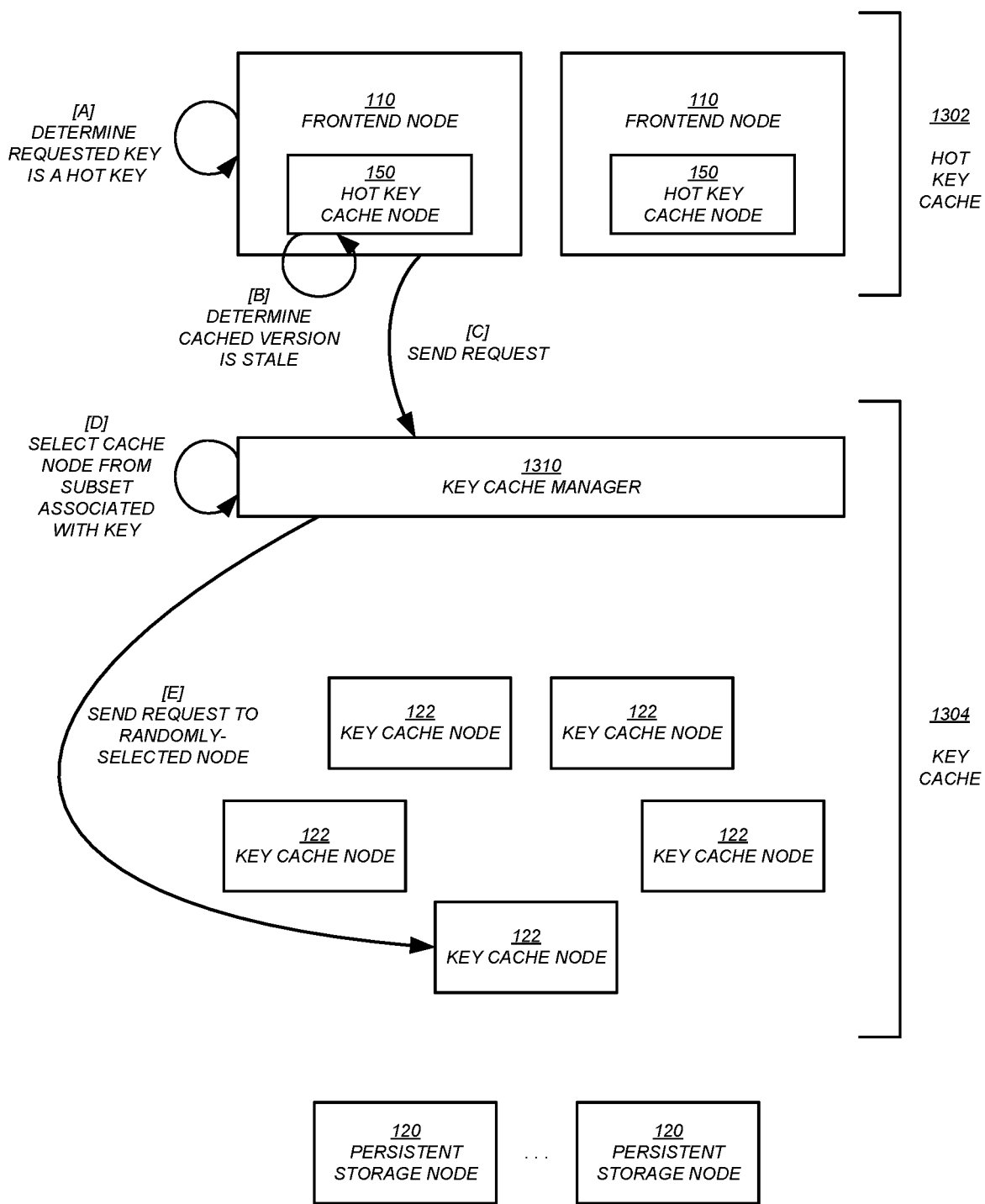
FIG. 13B is a block diagram of illustrative data flows and interactions between components of multi-level cache architecture according to some embodiments.

As shown in FIG. 13B, if a frontend node 110 determines at [A] that the key of the requested data object is one of a set of hot keys, then the frontend node 110 may attempt to service the request from a hot key cache node 150. The particular frontend node 110 to which the current data object request is initially routed may be selected at random, selected according to a round robin scheme, or selected using some other load balancing method such that requests for particular hot keys are not always routed to the same hot key cache node 150 but rather are distributed among all hot key cache nodes 150. At [B], the hot key cache node 150 may determine whether a cached version of the requested data object is available, and if so, whether the cached version is valid. For example, the hot key cache node 150 may submit a verification request to the witness service 116 to obtain sequence data regarding a latest change to the data object, an update-to-date version of the data object, or otherwise the minimum required version of the data object to be distributed. If the cached version of the requested data object is not valid or not available, the hot key cache node 150 can pass the request to the key cache 1302 at [C].

At [D], the key cache manager 1310 may determine the proper key cache node 122 to which the request is to be routed. The key cache management 1310 may then route the request to the selected key cache node 122 at [E]. In some embodiments, the key cache manager 1310 may implement a load balancing method to distribute requests for a particular hot key among multiple key cache nodes 122, rather than determining a specific mapping as may normally be done in a consistent hash ring implementation. An example of a routine that the key cache management 1310 may use to route requests to key cache nodes 122 is shown in FIG. 14.

Figure 14:
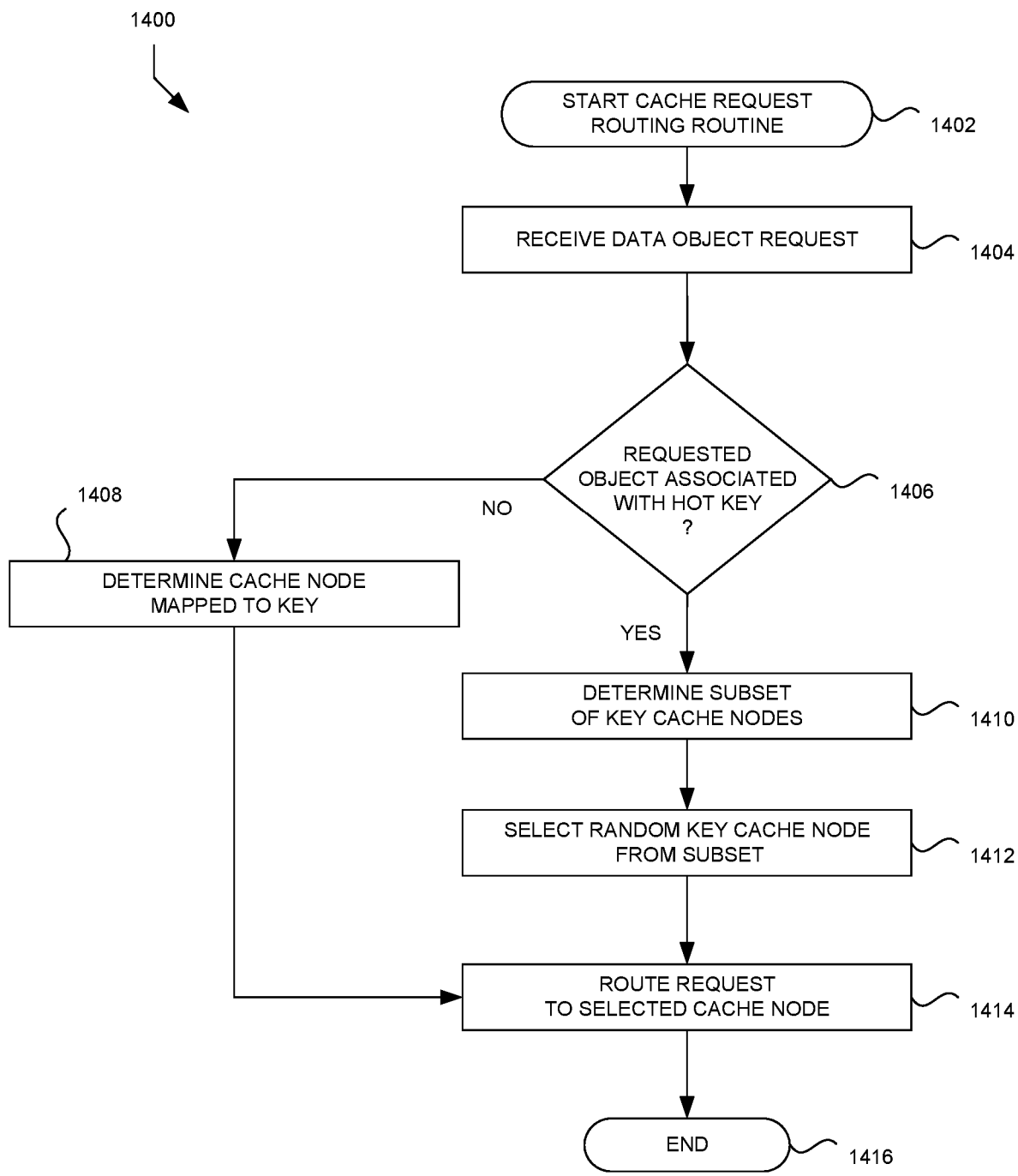
FIG. 14 is a flow diagram of an illustrative routine for use of a multi-level cache architecture according to some embodiments.

FIG. 14 is a flow diagram of an illustrative routine 1400 that may be executed by the key cache manager 1310 to route requests to key cache nodes 122. Advantageously, the key cache manager 1310 may route non-hot key requests to particular nodes in a consistent hash ring using a predetermined mapping of keys to nodes, while distributing hot key requests among different nodes in a dynamic load-balanced manner.

Although the description that follows is with respect to an example implementation in which the routine 1400 is performed in the context of the multi-tier caching architecture shown in FIGS. 13A and 13B, the example is for purposes of illustration only and is not intended to be limiting. In some embodiments, the routine 1400 may be used in other environments and to manage other types of data.

The routine 1400 may begin at block 1402 in response to an event, such as when a key cache manager 1310 begins operation. When the routine 1400 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 1400 or portions thereof may be implemented on multiple processors, serially or in parallel.

At block 1404, the key cache manager 1310 may receive a data object request. The data object request may include, reference, or otherwise be associated with a key of the requested data object.

At decision block 1406, the key cache manager 1310 may determine whether the request is a hot key request. In some embodiments, the request may be tagged as a hot key request or a non-hot key request. In some embodiments, hot key requests and non-hot key requests may be separate requests (e.g., separate request signatures, message types, or the like). In some embodiments, the key cache manager 1310 may determine whether the key of requested data object is a hot key based on a listing of hot keys. The key cache manager 1310 may use the tag, request type, key, another signal, or some combination thereof to determine whether the request is a hot key request. If the request is not a hot key request, the routine 1400 may proceed to block 1408. Otherwise, if the request is a hot key request, the routine 1400 may proceed to block 1410.

At block 1408, because the request is not a hot key request, the key cache manager 1310 may determine the key cache node 122 to which the key of the requested data object is assigned. In some embodiments, the key cache manager 1310 may evaluate a hash function or use some other mapping technique to determine the particular key cache node 122 of the set of key cache nodes in the key cache 1304. For example, the output of the hash function may be an index or identifier of a key cache node 122. The routine 1400 may then proceed to block 1414, where the key cache manager 1310 may forward the request to the assigned key cache node 122.

In some embodiments, when the request is not a hot key request, the key cache manager 1310 may determine a key cache node 122 from a set of key cache nodes 122 to which the object is assigned or with which the object is otherwise associated. For example, the key cache manager 1310 may use one of the methods described below at blocks 1410 and 1412 for processing hot key requests. In such cases, the quantity of nodes in the subset of key cache nodes that may service a request that is not a hot key request may be smaller than the quantity of nodes in the subset of key cache nodes that may service a hot key request. The smaller subset may be used for non-hot key requests in order to provide a desired cache hit rate, while the larger subset may be used for hot key requests to balance the larger load of such requests, as described below.

At block 1410, because the request is a hot key request, the key cache manager 1310 may determine a subset of the key cache nodes that may service the request. In some embodiments, there may be x hot key cache nodes 150 in the hot key cache 1302, and y key cache nodes 122 in the key cache 1304, where $x \gg y$ (e.g., x=50,000 and y=15,000). Because of the comparatively large number of hot key cache nodes 150 in such implementations, when a cached data object associated with a hot key is invalidated, there may be a large number of requests passed from the hot key cache 1302 to the key cache 1304 in a short period of time (e.g., up to 50,000). If all requests were sent to a single key cache node 122 as described above for non-hot key requests, then the single key cache node 122 may not be able to service the requests and a situation similar to a denial-of-service attack may be experienced. This effect would be exacerbated if multiple hot keys were invalidated simultaneously or in a short period of time, and more than one of those hot keys is assigned to the same key cache node 122. To reduce or eliminate these issues, hot key requests may be distributed among multiple key cache nodes 122 to balance the load for handling such requests. However, rather than distributing hot key requests for a single hot key among all of the key cache nudes, the hot key requests may be distributed among a subset of all available key cache nodes 122. The subset may be used in order to improve the likelihood of cache hits, while still distributing the load for servicing hot key requests among multiple key cache nodes 122 rather than assigning each key to a particular key cache node, as described above for non-hot key requests.

In some embodiments, the key cache manager 1310 may use a plurality of hash functions to identify the subset of the key cache nodes 122 that may service the request. For example, if each key is to be associated with a different respective subset of z nodes, where $z \ll y$, (e.g., z=400 and y=15,000), then the key cache manager 1310 may evaluate z different hash functions using the key to determine the z nodes that may service the request for the key.

In some embodiments, the key cache manager 1310 may use a single hash function with varied input, rather than multiple separate hash functions, to identify the subset of the key cache nodes 122 that service the request. For example, if each key is to be associated with a different respective subset of z nodes, then the key cache manager 1310 may append z different values to the key and evaluate the hash function once for each of the z different appended values (e.g., if z=400 and the data object key="abc" then the hash function may be evaluated for "abc1," "abc2," and so on to "abc400").

In some embodiments, rather than identifying the subset of key cache nodes 122 that are associated with a given hot key each time a hot key request is received, the key cache manager 1310 may generate a random number in a range that corresponds to the size of the subset, append the number to the hot key, and evaluate a hash function to determine the key cache node 122 that is to service this particular hot key request. For example, if the subset is z key cache nodes 122, then the key cache manager may generate a random number in the range 1-z and append the number to the hot key prior to evaluating the hash function (e.g., a random number 67 is generated in the range 1-400, and appended to the key "abc" to obtain hash function input "abc67"). In this way, the hash function is only evaluated once per request, but the results are still randomized within a particular subset size and tied to the particular key by use the key and random number as input to the hash function.

The example methods of determining the subset of nodes to handle a hot key request are illustrative only, and are not intended to be limiting, required, or exhaustive. In some embodiments, additional or alternative methods may be used.

At block 1412, the cache manager 1310 may select a particular key cache node 122 from the subset of key cache nodes determined above. The key cache node 122 selected from the subset may a randomly-selected key cache node 122. In some embodiments, the cache manager 1310 may generate randomized selection data to select the key cache node 122. For example, the cache manager 1310 may use a pseudo random number generator to generate a random number (e.g., between 1 and z inclusive). The subset of key cache nodes 122 identified in block 1410 may be assigned indices, and the key cache node 122 with the index that corresponds to the random number may be selected.

At block 1414, the cache manager 1310 may route the request to the selected key cache node 122, which can service the request. For example, the key cache node 122 may perform some or all of the operations shown in FIG. 2 and described in greater detail above. In some embodiments, the key cache node 122 may utilize a throttling technique to reduce the load on persistent storage nodes in retrieving updated versions of hot key data items. For example, the key cache node 122 may use a token scheme, such as one management by a token bucket algorithm or leaky bucket algorithm to control the flow of requests to the persistent storage nodes 120.

In some embodiments, there may be no hot key cache 1302. In other embodiments, the hot key cache 1302 may not actually cache data objects but may instead merely identify a key of a requested object as a hot key before passing the request to the key cache 1302. In these embodiments, each request for a hot key is serviced by the key cache 1304.

Figure 15:
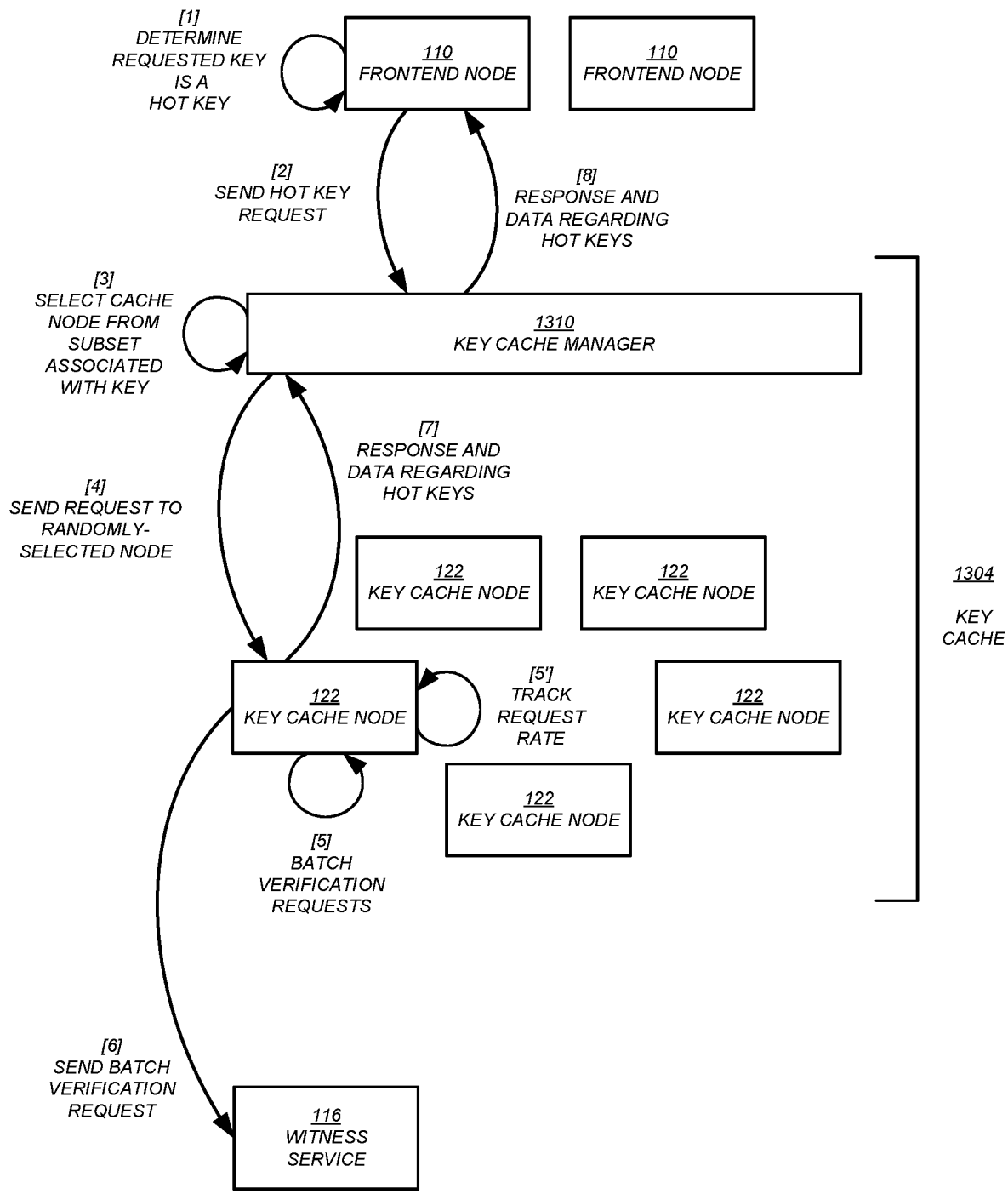
FIG. 15 is a block diagram of illustrative data flows and interactions between components of multi-level cache architecture according to some embodiments.

FIG. 15 illustrates an architecture 1500 in which the requests are passed through the frontend nodes 110/hot key cache nodes 150 to the key cache 1304 without caching. Such requests may be referred to as pass-through requests.

As shown, when a data object request is received by the distributed storage system 104, it may first be evaluated to determine whether the key of the requested data object is a hot key. If a frontend node 110 determines at [1] that the key of the requested data object is one of a set of hot keys, then the request may be passed to the key cache 1304 at [2]. Illustratively, the request may be passed with a tag indicating that the request is for a hot key, or a separate hot key request may be generated and sent to the key cache 1304. In contrast, if the frontend node 110 determines that the key is not a hot key, then the request may be passed to the key cache 1304 at without a tag indicating that the request is for a hot key, or a non-hot key request may be generated and sent to the key cache 1304, where it may be processed as described above.

The key cache 1304 may process a hot key request [3]. For example, the hot key request may be processed as described above, such as by selecting a particular key cache node 122 from a subset of nodes of the key cache 1304 using a pseudo-random selection process, and forwarding the request on to the selected key cache node 122 at [4].

Performing a verification request from a key cache node 122 to the witness service 116 each time a hot key request is processed may cause a degradation in performance of the witness service 116. To address and mitigate these situations, verification requests for hot keys may be batched and performed as a single hot key request.

In some embodiments, as shown in FIG. 15, a key cache 1304 may batch verification requests for a given hot key (or different hot keys) at [5]. The batch may be maintained until a batch request criterion is satisfied. For example, the batch request criterion may relate to a maximum size of the batch before a verification request is to be sent. As another example, the batch request criterion may relate to a maximum amount of time that a given request may be batched (e.g., the maximum amount of time since a batch was created) before a verification request is to be sent. As another example, multiple criteria may be used, such as by triggering the verification request when either (1) the batch size meets a threshold, or (2) the length of time since creation of the batch meets a threshold. When the batch request criterion/criteria are satisfied, a batch verification request may be sent to the witness service 116 at [6]. The batch request may be a single request regarding a single hot key, and the key cache node 122 may apply the results of the request to all pending requests for the hot key that the key cache node 122 is currently servicing. In some embodiments, a batch may include requests for multiple different hot keys, and the batch request may include a separate request for each of the hot keys.

In some embodiments, the keys that are considered to be hot keys are determined based on the rate at which the corresponding objects are requested. For example, keys for objects that are requested at the highest rates, such as the top i objects by request rate or the top j percent of objects by request rate, may be considered hot keys. As another example, keys for objects that are requested at a threshold rate, such as k requests per unit of time, may be considered hot keys. The key cache nodes 122 that service requests may track the request rates for object requests that they service. An individual key cache node 122 can provide, to upper layers in the request path (e.g., key cache manager 1310, frontend nodes 110, etc.), a signal regarding the keys that the key cache node 122 considers to be hot (e.g., based on satisfaction of a request rate criterion). For example, as shown in FIG. 15, a key cache node 122 can provide data regarding hot keys along with a response to a data object request. In this way, prior layers of the request path can be notified of new hot keys, and can then determine whether subsequent requests are hot key requests.

Although the hot key determination at the key cache nodes 122 and signaling to prior layers is shown and described with respect to the embodiment illustrated in FIG. 15, the example is illustrative only and is not intended to be limiting or required. In some embodiments, other methods of determining and signaling hot keys may be used. In addition, a hot key determination and signaling method may be part of any other embodiment. Illustratively, the embodiments illustrated in FIGS. 13A-13B may use the same or similar hot key determination and signaling methods as shown in FIG. 15. For example, key cache nodes 122 may maintain rate data regarding request rates observed by the respective key cache nodes 122 for individual keys and the key cache nodes 122 may signal the request rates or other information regarding likely hot keys to prior layers. In addition, the nodes of the hot key cache 1302 may maintain objects in cache according to a least-recently-used ("LRU") protocol in which the hot key cache nodes 150 are configured to store a maximum number of objects or dedicate a maximum amount of storage space to objects. When a new object or updated version of an object is obtained and is to be added to the cache, the least-recently-used object (e.g., the least-recently requested and therefore "coldest" object) is purged from the cache. Thus, the hottest keys are maintained by the hot key cache nodes 150.

Dynamic Partition Management

The distributed storage system 104 may store any number of data objects. In some cases, the number may be quite high, such as millions, billions, or more individual data objects. A single set of computing resources may be unable to adequately maintain and respond to requests for information regarding every object, such as routing information regarding the persistent storage nodes on which a current version of each object may be obtained, verification information regarding the current version of each object, and the like. In order effectively maintain and respond to requests for data objects and related information, the data objects may be separated into discrete subsets, also referred to as partitions, that may be managed by different sets of computing resources.

In some embodiments, the key space of data item keys may be used to define and manage partitions such that a first subset of keys may be assigned to a first partition, a second subset of keys may be assigned to a second partition, and so on. The subsets may be defined with respect to the keys themselves. For example, keys of data items may be defined using hexadecimal numbers of preset or varying length, while a partition may be associated with a particular key prefix. Thus, a partition may be defined as the set of all data items with key prefixes matching a particular key prefix of the partition, and not matching any other partition's key prefix that is longer (e.g., more hexadecimal symbols). Illustratively, one partition may be defined as the "f" partition, and another partition may be defined as the "foo" partition. There may not be any partition with a key length longer than three hexadecimal symbols beginning with "foo." In this illustrative example, all data items with keys beginning with "foo" would be part of the "foo" partition, while all other data items with keys beginning with "f" would be part of the "f" partition.

Each partition may be associated with a set of computing resources, some of which may be uniquely assigned to the partition, and some of which may be shared by multiple partitions. In some embodiments, a set of computing resources used to manage a partition of data objects may include a key cache 1304, a set of persistent storage nodes 120, a transaction log 200, and a witness service 116 instance. Illustratively, the transaction log 200 and persistent storage nodes 120 may be specific to a single partition, while the key cache 1304 and witness service 116 instance may be shared among several partitions.

In a distributed storage system 104 in which the number of data objects and requests for the data objects increases over the course of time, and sometimes in short periods of time, the load on a set of computing resources assigned to a partition can increase and cause performance degradation. To balance the load and otherwise improve performance, new partitions can be split from partitions that are experiencing a heavy volume of requests.

Figure 16:
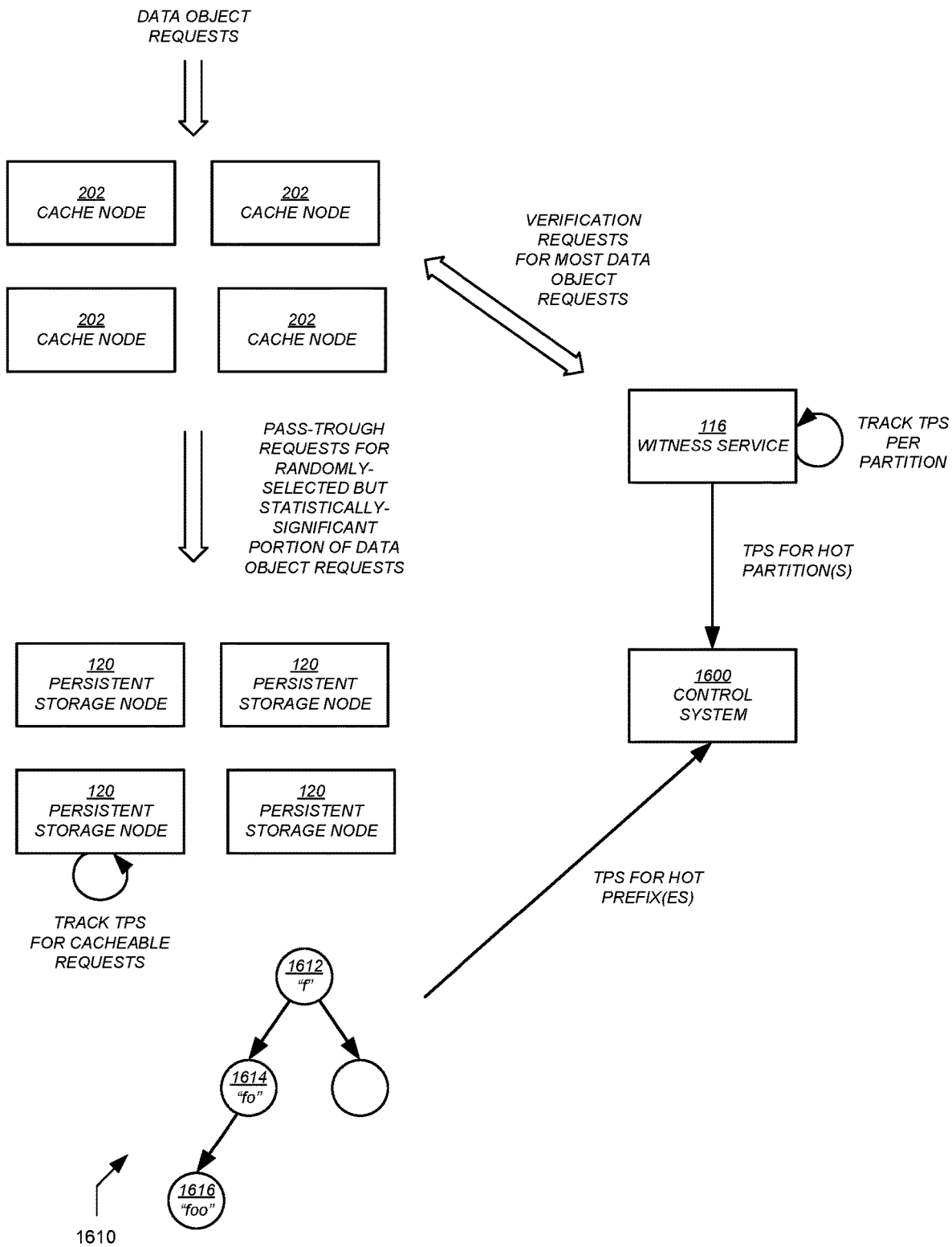
FIG. 16 is block diagram of illustrative data flows and interactions between components of a distributed storage system to track request rates and make partition splitting decisions according to some embodiments.

FIG. 16 is a block diagram of illustrative data flows and interactions between cache nodes 202, a witness service 116, a set of persistent storage nodes 120, and a control system 1600 (also referred to as a "control plane system") to manage data object partitions. The cache nodes 202 may be hot key cache nodes 150 and/or key cache nodes 122.

In some embodiments, as shown, the cache nodes 202 may receive data object requests. Prior to servicing the requests, the cache nodes 202 may make verification requests to the witness service 116 instance for the partition. The witness service 116 instance may track such requests. For example, the witness service 116 instance may maintain request rate information regarding verification requests associated with the partition. The request rate may be determined using an exponential decay algorithm, for example, in which requests are weighted and those weights are decayed over time (e.g., according to a half-life).

In addition to handling data object requests as described in greater detail herein, the cache nodes 202 may in some embodiments send a subset of data object requests to the persistent storage nodes 120 even if the cache nodes 202 would otherwise be able to service the requests out of their caches. For example, the cache nodes 202 may randomly select individual requests to pass through to the persistent storage nodes 120 such that a statistically significant portion of data item requests are passed through in a given period of time. Illustratively, the cache nodes 202 may use a random number generation algorithm to select a percentage of requests (e.g., 0.1, 0.5, 1.0, 5.0 etc.) to pass through to the persistent storage nodes 120 without first checking to see whether cached versions of the requested data objects are available at the cache nodes 202 and/or without first generating verification requests to the witness service 116 instance regarding the requested data objects.

The cache nodes 202 may pass the portion of requests to the persistent storage nodes 120 so that the persistent storage nodes may generate more granular data than maintained by the witness service 116 instance. Such requests may be referred to as pass-through requests. In some embodiments, the storage nodes 120 may store data regarding requests associated with particular key portions (e.g., key prefixes) that are longer or otherwise more specific than the prefix of the current partition with which the storage nodes 120 are associated. For example, if the current partition is the "f" partition, a storage node 120 may store request rate data regarding requests for data objects, such as using an exponential decay algorithm in which requests are weighted and those weights are decayed over time (e.g., according to a half-life). The storage node 120 may determine when the request rate for data objects associated with keys having a more specific prefix (e.g., a prefix beginning with "f" followed by one or more additional hexadecimal symbols) satisfies a criterion, such as a threshold. If the request rate satisfies the criterion, then the storage node 120 may split out the more specific prefix and begin tracking request rates for prefixes that are even more specific. The request rate information may be used to determine how to split the current partition into multiple partitions such that the overall request rates of the partitions may be close to equal.

FIG. 16 shows an example of a rate tracking structure 1610 that may be used to track the request rates (e.g., as measured or estimated in transactions per second or "TPS") for various subsets of a partition. As described above, the partition may be associated with a particular prefix. The rate tracking structure 1610 may be used to track request requests for data objects associated with keys that are more specific than the prefix of the current partition.

In some embodiments, as shown, the rate tracking structure 1610 may be a heap tree (e.g., a minimum heap tree or maximum heap tree) with a set of elements. The root element 1612 may be associated with the prefix of the current partition. Each child, grandchild, and other descendent element may be associated with a more specific prefix that begins with the prefix of the current partition. In addition, each element may be associated with a rate tracker. As requests are received by the persistent storage node 120, the rate trackers for the most specific prefix matching the keys of the requested data objects are updated to capture the incoming request rate. For example, when a request is received for a key associated with a particular element 1614 (e.g., the element of the rate tracking data structure 1610 that has the most specific prefix corresponding to the requested key), then the rate tracker for that element 1614 is evaluated (e.g., using an exponential decay algorithm) to determine whether the rate exceeds a threshold or satisfies some other criterion. If so, a child element 1616 may be created to track a request rate for an even more specific key prefix, such the more specific key prefix that has the highest request rate of all prefixes more specific that the prefix of the existing element 1614.

In some embodiments, the rate tracking data structure 1610 may have a fixed number of elements. Thus, when the rate tracker for a particular element exceeds a threshold or satisfies some other criterion, then the persistent storage node 120 may replace an existing element with a new element to track the request rate for a more specific prefix.

The control system 1600 may determine, based on data from the witness service 116 instance, that a particular partition is experiencing too high of a volume of requests (e.g., there is too much "heat" on the partition). The level of heat may cause a degradation in performance of the witness service 116 instance to respond to verification requests associated with the partition or other partitions that share the same witness service 116 instance. In response, the control system 1600 may obtain more granular request rate data from the persistent storage nodes 120 assigned to the partition. For example, the control system 1600 may obtain the rate tracking structure 1610 or individual values derived therefrom to determine how to split the current partition and reduce the heat on the partition.

Figure 17:
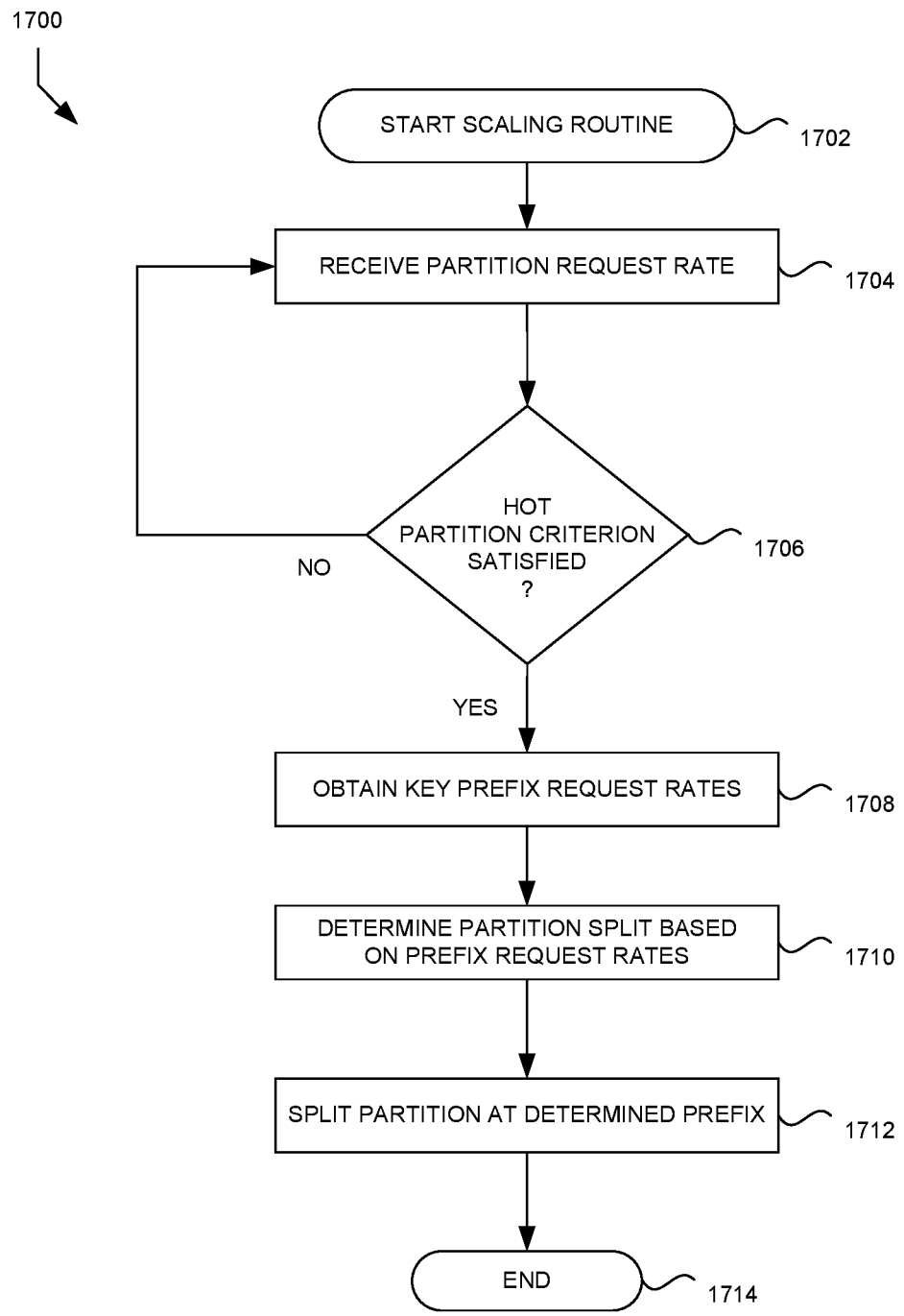
FIG. 17 is a flow diagram of an illustrative routine for splitting a storage partition based on request data according to some embodiments.

FIG. 17 is a flow diagram of an illustrative routine 1700 that may be executed by the control system 1600 to make scaling decisions. The scaling decisions may be made, and scaling actions may be implemented, to reduce heat on the witness service 116 instance to which a partition is assigned, and/or to reduce the likelihood of overloading persistent storage nodes when large volume of cache invalidations occur for keys assigned to the persistent storage nodes. Advantageously, the specific manner in which the computing resources for a partition are scaled (e.g., the specific manner in which the partition is split) to reduce heat on the witness service 116 instance may be determined using data obtained from an entirely separate system (e.g., the persistent storage nodes 120), and in some cases based on requests never verified with the witness service 116 instance (e.g., based on requests randomly passed through to the persistent storage nodes 120).

The routine 1700 may begin at block 1702 in response to an event, such as when a control system 1600 begins operation. When the routine 1700 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 1700 or portions thereof may be implemented on multiple processors, serially or in parallel.

At block 1704, the control system 1600 may receive partition request rate data from a witness service 116 instance. In some embodiments, the request rate data may be obtained from a priority queue of the witness service 116 instance. For example, the control system 1600 may receive request rate data associated with the top n partitions (e.g., where n=10) in terms of experiencing the greatest current request rates.

At decision block 1706, the control system 1600 may determine whether any partition satisfies a scaling criterion. If the scaling criterion is satisfied for any partition, the routine 1700 may proceed to block 1708. Otherwise, if the scaling criterion is not satisfied for any partition, then the routine 1700 may return to block 1704 to continue monitoring request rate data from the witness service 116 instance.

In some embodiments, the determination may be made based on an analysis of the request rate data for individual partitions with respect to a threshold. For example, if a current request rate for a particular partition exceeds a maximum threshold, then the scaling criterion may be satisfied for that partition. In some embodiments, such as when a scaling action to be implemented is the splitting of the partition, the scaling criterion may also be referred to as a partition splitting criterion.

At block 1708, the control system 1600 can obtain key prefix request rate data from one or more persistent storage nodes 120 associated with the partition that is to be split. In some embodiments, the control system 1600 can obtain the rate tracking structure 1610, or data derived therefrom. For example, the control system 1600 may request or otherwise receive specific key prefixes and corresponding request rate metrics.

At block 1710, the control system 1600 can determine how to scale the computing resources assigned to the partition. In some embodiments, the scaling action is to split the partition and assign at least one portion of the partition to a different set of computing resources than another portion of the partition.

The control system 1600 may evaluate the key prefix request rate data to determine an even split of request rate across the split partitions. In some embodiments, the control system 1600 may be configured to split one specific key prefix off of the current partition, or to otherwise split the partition into two. For example, the control system 1600 may determine a split that is as close to 50/50 as possible based on the request rate data for the more specific prefixes available. Illustratively, the control system 1600 may select the prefix associated with as close to 50% of the overall request rate for the partition as possible. In some cases, the selected prefix may have greater than 50% of the overall request rate, and in other cases the selected prefix may be associated with less than 50% of the overall request for the partition. In some cases, the control system 1600 may not be able to determine an even or substantially even split of request rate for the partition. For example, if a particular key is experiencing an extremely high rate of requests (e.g., the key is a hot key), then that key or the most specific prefix including the key for which request rate data is available may be associated with significantly more than 50% of the requests. In such cases, the control system 1600 may determine to split that specific prefix from the current partition so that the heat associated with that specific prefix does not continue to negatively affect the rest of the partition.

At block 1712, the control system 1600 can split the partition as determined above. Splitting the partition may include assigning a new set of computing resources to manage the more specific key prefix that is being split from the current partition, while keeping the current partition with the existing set of computing resources.

Figure 18:
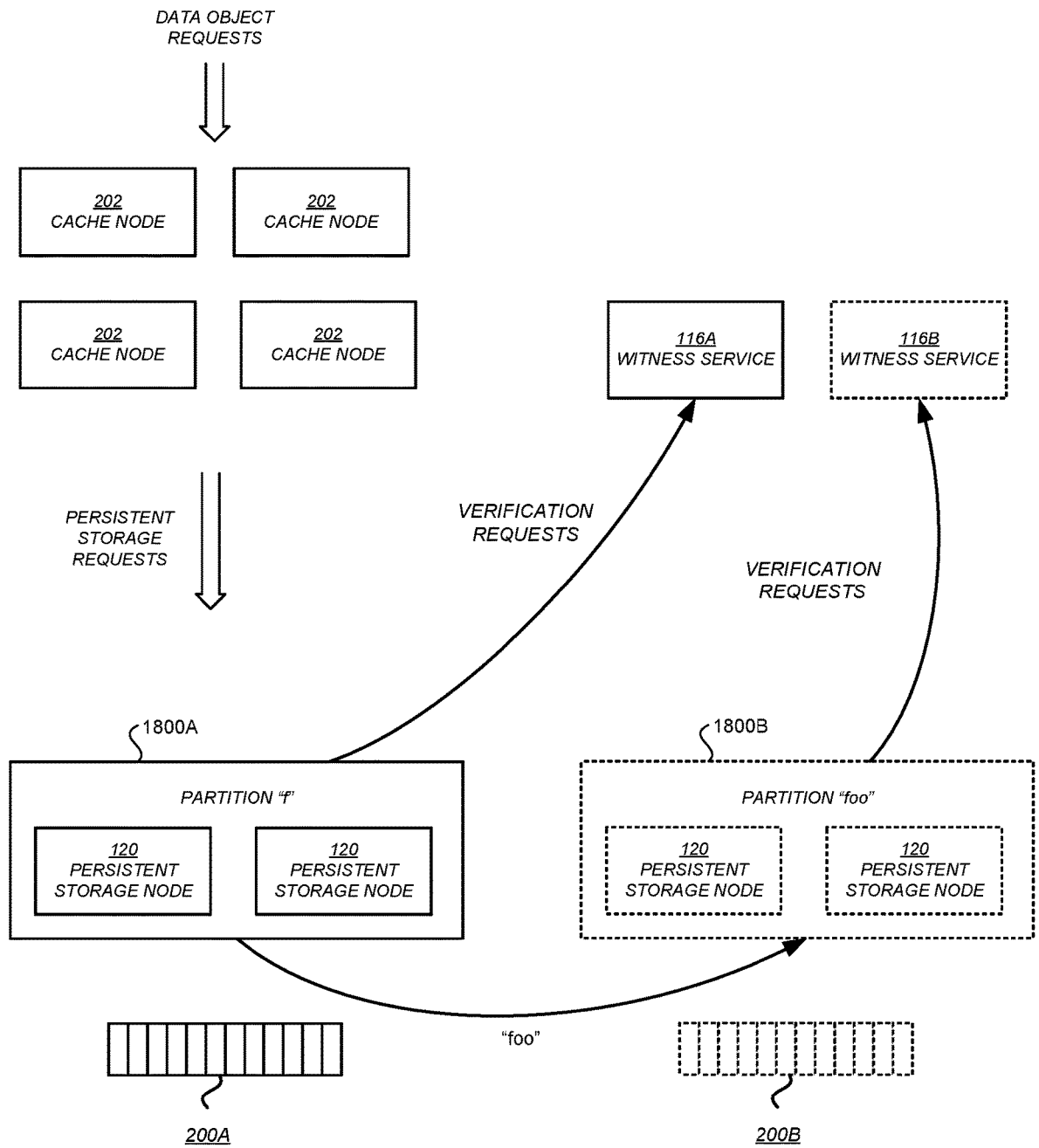
FIG. 18 is a flow diagram of illustrative data flows and interactions between components of a distributed storage system to split a storage partition according to some embodiments.

FIG. 18 illustrates an example of splitting a partition off of an existing partition and moving it to a new set of computing resources. As shown, a first partition may be associated with a prefix "f" and may be managed by a first set of computing resources, including a transaction log 200A, a persistent storage node pool 1800A, and a witness service instance 116A. A control system 1600 may determine to split off a subset of data objects from the first partition, such as data objects associated with keys having the more specific prefix "foo," into a second partition.

The control system 1600 may assign the second partition to a new transaction log 200B, persistent storage node pool 1800B, and witness service instance 116B. For example, the control system 1600 may copy data associated with the second partition from persistent storage node pool 1800A to persistent storage pool 1800B. Transaction log 200B may be the log to which new writes associated with the partition are written, and from which the data is eventually persisted to the persistent storage pool 1800B. The control system 1600 may also cause all of the cache records associated with the second partition to be invalidated so that cache requests are eventually sent to the persistent storage pool 1800B to receive the most up-to-date versions of data objects from the partition. In addition to updating the data objects themselves, the various components of the distributed storage system 104 may obtain and use updated routing data to access the data in the partition that has been split out. Examples of managing routing data updates are described in greater detail below.

Routing Data Management

When a request for a data object is received by the distributed storage system 104, the request may require routing to the computing resources that manage the partition to which the requested data object is assigned. When a data object is moved from one set of computing resources to another set of computing resources (e.g., when a partition is split into two partitions), routing data used to route request for that data object may be changed and any system or component using out-of-date routing data will not be able to access the data object, or may access an out-of-date version of the object.

To address these issues, among others, a routing data management protocol may be implemented such that when routing data associated with a data object, partition of data objects, or a group of partitions is changed, access to the data object using prior versions of the routing data is prevented.

Figure 19:
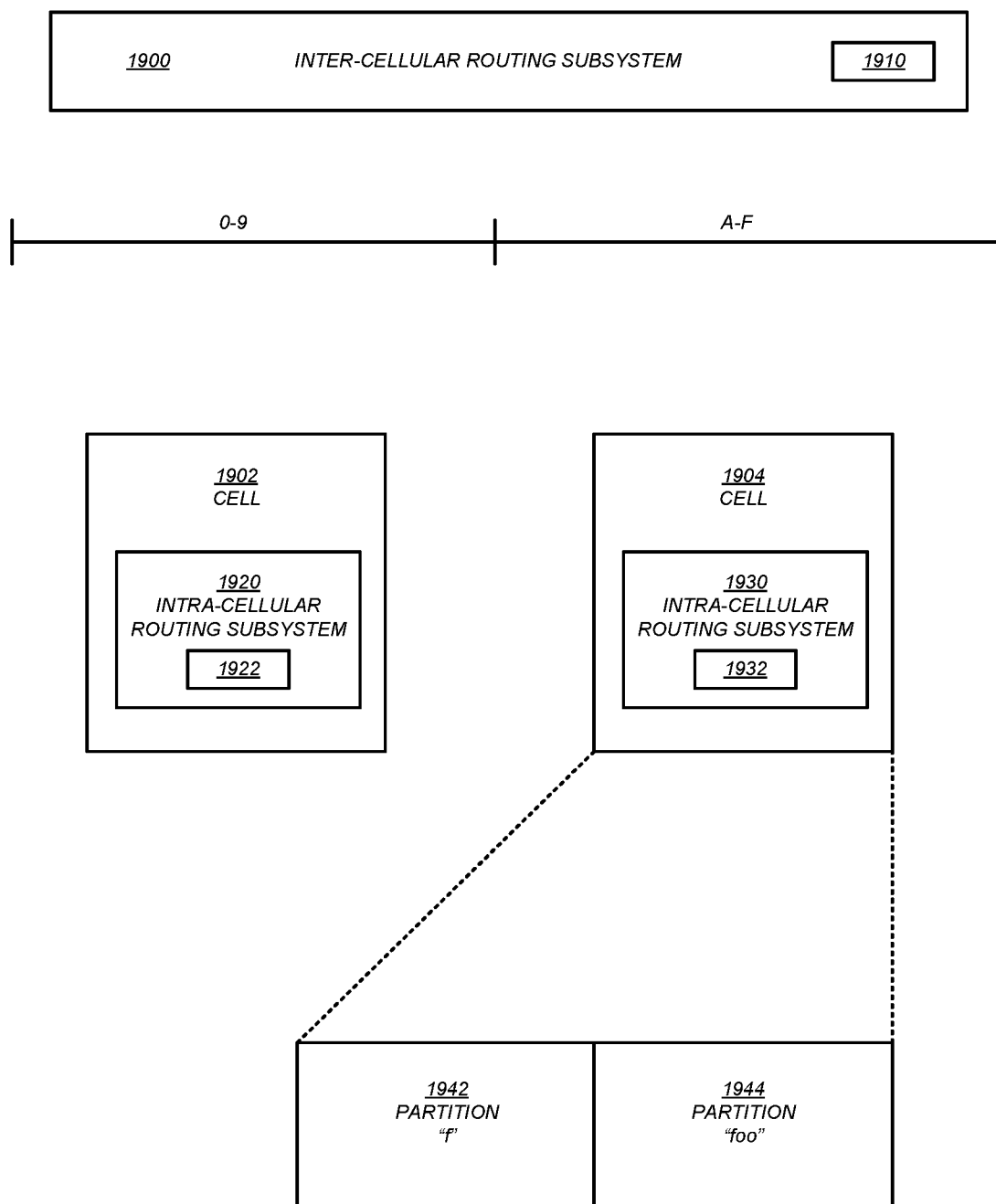
FIG. 19 is a block diagram of an illustrative multi-tier routing system in a distributed storage system according to some embodiments.

FIG. 19 is a diagram of an illustrative multi-tier architecture for organizing partitions of data objects, managing changes to routing data, and managing access to data objects using the routing data. In the illustrated multi-tier architecture, data objects may be assigned to partitions, and partitions may be managed as groups or "cells."

In some embodiments, cells may be defined according to the keys of the partitions within the cells, similar to partitions being defined being defined according to the keys of the data objects within the partitions. In contrast to the most-specific key prefix assignment of data objects to partitions (e.g., whereby a data object is assigned to the partition with the longest or otherwise most-specific key prefix matching the key prefix of the data object), cells may be defined using a range of keys such that any partition with a key that is within a cell's range of keys is assigned to the cell.

In the illustrated example, two cells are shown: cell 1902 and cell 1904. The cells are each associated with a different contiguous range of keys in the key space 1950 of the distributed storage system 104. Cell 1902 is associated with the range of keys beginning with any of the symbols "0"-"9." Cell 1904 is associated with the range of keys beginning with any of the symbols "a"-"f."

Cell 1904 is shown with two illustrative partitions: partition 1942 and 1944. Partition 1942 is associated with key beginning with a key prefix of "f" Partition 1944 is associated with key beginning with a key prefix of "foo." In this example, any data object of the distributed storage system 104 with a key beginning with "foo" will be assigned to partition 1944, assuming there are no other partitions with a matching key prefix that is more specific than "foo." Any data object of the distributed storage system 104 will be assigned to partition 1942, assuming there are no other partitions with a matching key prefix that is more specific than "f" All of these data objects are assigned to cell 1904.

When a request is received by the distributed storage system 104, it may be handled by an inter-cellular routing subsystem 1900. The inter-cellular routing subsystem 1900 may use inter-cellular routing data 1910 to route the request to the proper cell. In some embodiments, the inter-cellular routing data 1910 may specify computing resources to which the request is to be routed. For example, the inter-cellular routing data 1910 may specify the ranges of keys assigned to or otherwise associated with each cell of the distributed storage system 104, or some subset thereof. Thus, the inter-cellular routing subsystem 1900 can resolve the proper cell for an incoming request based on the key(s) in the request and the ranges of keys in the inter-cellular routing data 1910. In some embodiments, the inter-cellular routing data 1910 may also include the network address, host names, and/or other information that may be used to route a request in a network to the appropriate system, device, subnet, or other network location.

Once routed to a particular cell, an intra-cellular routing subsystem may use further routing metadata—intra-cellular routing data—to route the request to a particular partition based on the prefix of the key and the prefixes assigned to the different partitions. In some embodiments, intra-cellular routing metadata can be used to determine the network address, host name, and/or other information regarding the destination to which the request is to be routed. Once routed to a particular partition, the request may be handled by a cache node and/or passed to a persistent storage node.

With reference to an illustrative example, if a request is received for a data object with a key of "foobar," then the inter-cellular routing subsystem 1900 may use inter-cellular routing data 1910 route the request to cell 1904, which is associated with keys in the range "a"-"f." The intra-cellular routing subsystem 1930 of cell 1904 may use intra-cellular routing data 1932 to route the request to the computing resources assigned to partition 1944. Illustratively, the intra-cellular routing data 1932 may specify the key prefix assigned to each partition of the cell 1904. In some embodiments, the intra-cellular routing data 1932 may also include the network address, host names, and/or other information that may be used to route a request in a network to the appropriate system, device, subnet, or other network location.

In contrast, if the key of the requested data object was "89f," then the inter-cellular routing subsystem 1900 may use inter-cellular routing data 1910 route the request to cell 1902, which is associated with keys in the range "0"-"9." The intra-cellular routing subsystem 1920 of cell 1902 may use intra-cellular routing data 1922 to route the request to the computing resources assigned to a particular partition.

Figure 20:
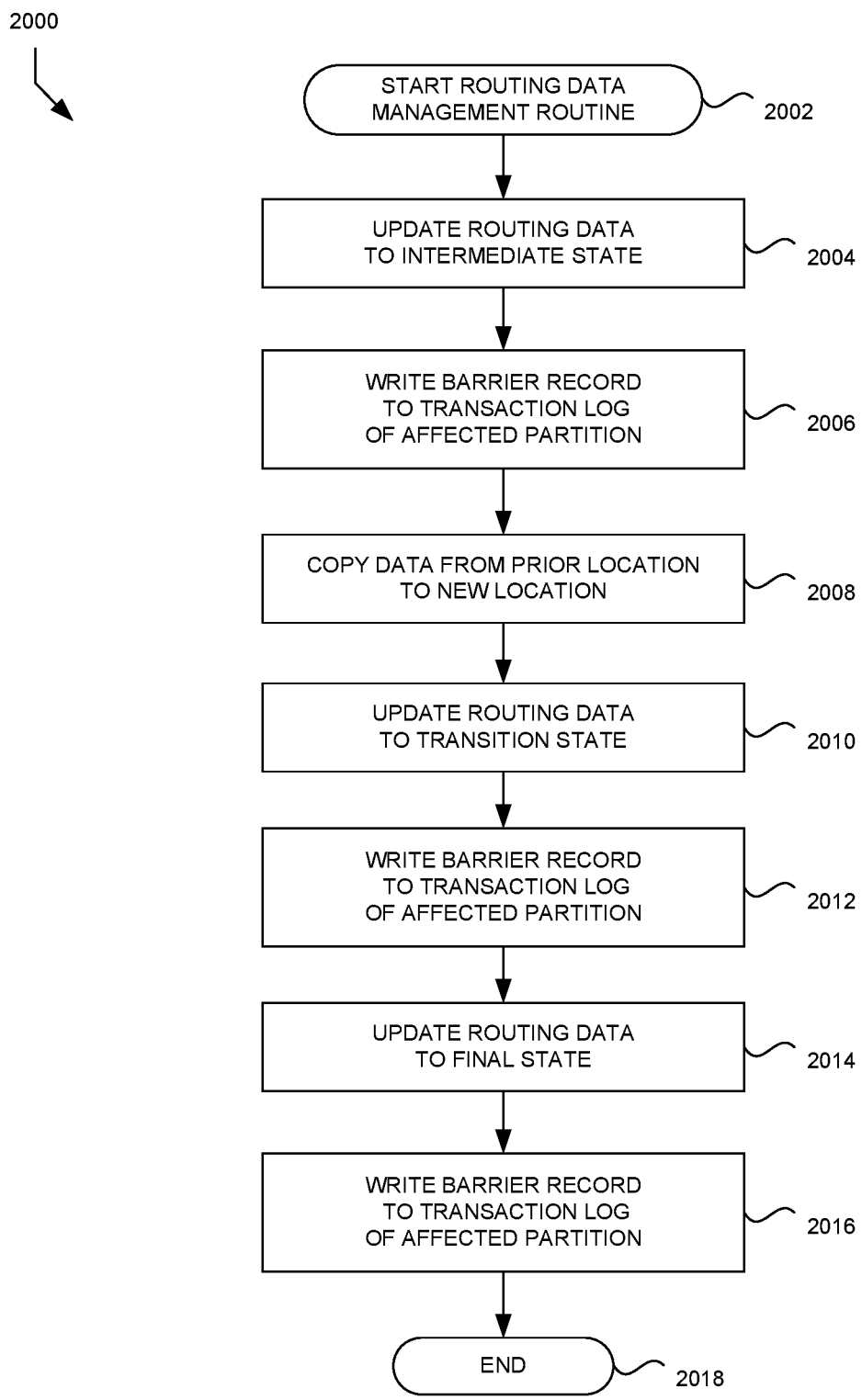
FIG. 20 is a flow diagram of an illustrative routine for modifying multi-tier routing data and implementing routing changes in a distributed storage system according to some embodiments.

FIG. 20 is a flow diagram of an illustrative routine 2000 that may be executed by the control system 1600 to modify routing data, such as inter-cellular routing data 1910 and/or intra-cellular routing data 1932, based on partition splitting operations, movement of partitions from one cell to another cell, etc. Advantageously, the control system 1600 may use special transaction log records, also referred to as "barrier" records, to cause storage nodes to reject requests associated with outdated routing data, to invalidate caches of data associated with outdated routing data, and the like.

The routine 2000 will be described with regards to "assigning" and changes to "assignments," which may be used for both cell assignments and partition assignments interchangeably. In addition, the routine 2000 will also be described with regards to changes to "locations," which may be used to refer to the computing resources on which data objects of cells and partitions, interchangeably, are stored. In general, changes to ether inter-cellular routing data or intra-cellular routing data—or both—may be managed using the routine 2000. Aspects of the routine 2000 will be described with further reference to the illustrative data flows and interactions shown in FIG. 21.

The routine 2000 may begin at block 2002 in response to an event, such as when a partition is split, when a partition is moved from one cell another cell, when a new cell is split from an existing cell, or the like. When the routine 2000 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 2000 or portions thereof may be implemented on multiple processors, serially or in parallel.

At block 2004, the control system 1600 may update inter-cellular routing data for an affected cell or partition. In some embodiments, an affected cell may include partitions that are part of a cell being split off of an existing cell to form a new cell, or part of an existing cell that is being moved to another existing cell. For example, if a prefix range such as "f0" to "ff" (e.g., all of the prefixes beginning with "f") is being moved from an "a" to "f" prefix range cell to a different cell, the control system 1600 may update the inter-cellular routing metadata 1910 to include the prefix range. Initially, the prefix range may be assigned to an existing cell, such as cell 1904 shown in FIG. 19. After subsequent processing operations are performed, the inter-cellular routing metadata 1910 may be updated to assign the prefix range to the new cell, as described in greater detail below.

In some embodiments, there may be separate items of routing data (whether inter-cellular or intra-cellular) for write requests and for read requests. This can be done to permit a phased migration of cells and partitions whereby data may continue to be read from a prior location (e.g., a prior set of computing resources) while writes are performed with respect to both the prior location and the new location (e.g., a new set of computing resources) until the new location is caught up or otherwise ready for use. In the present example, the inter-cellular routing data may be modified such that read requests continue to be routed to the prior/existing cell 1904, while write requests are to be routed to both the prior cell 1904 and to the new cell to which the partitions for the prefixes are being moved. This version of routing data may be referred to as an intermediate version of routing data, or a first intermediate version of routing data if there are multiple intermediate steps as described below.

At block 2006, the control system 1600 can notify computing resources associated with affected partitions that the applicable routing data has been changed. For example, the change made to the routing data above may cause a version of inter-cellular routing data to be incremented. The affected partitions may include any partitions with prefixes in the range of the affected cell. The control system 1600 can notify the computing resources associated with the affected partitions regarding the new version of routing data so that the computing resources can ensure that any requests associated with data in the affected partitions are made based on the new version of the routing data.

In some embodiments, the control system 1600 may cause a particular type of record, such as a barrier record, to be written to the transaction log of an affected partition. The barrier record may indicate the new version of routing data that is to be used to make any subsequent requests regarding keys in the affected partition. When such a barrier record is written to the transaction log 200, a coordinator subsystem 124 may not permit any requests to a persistent storage node 120 of the partition until the persistent storage node 120 has read the barrier record and applied its meaning.

Figure 21:
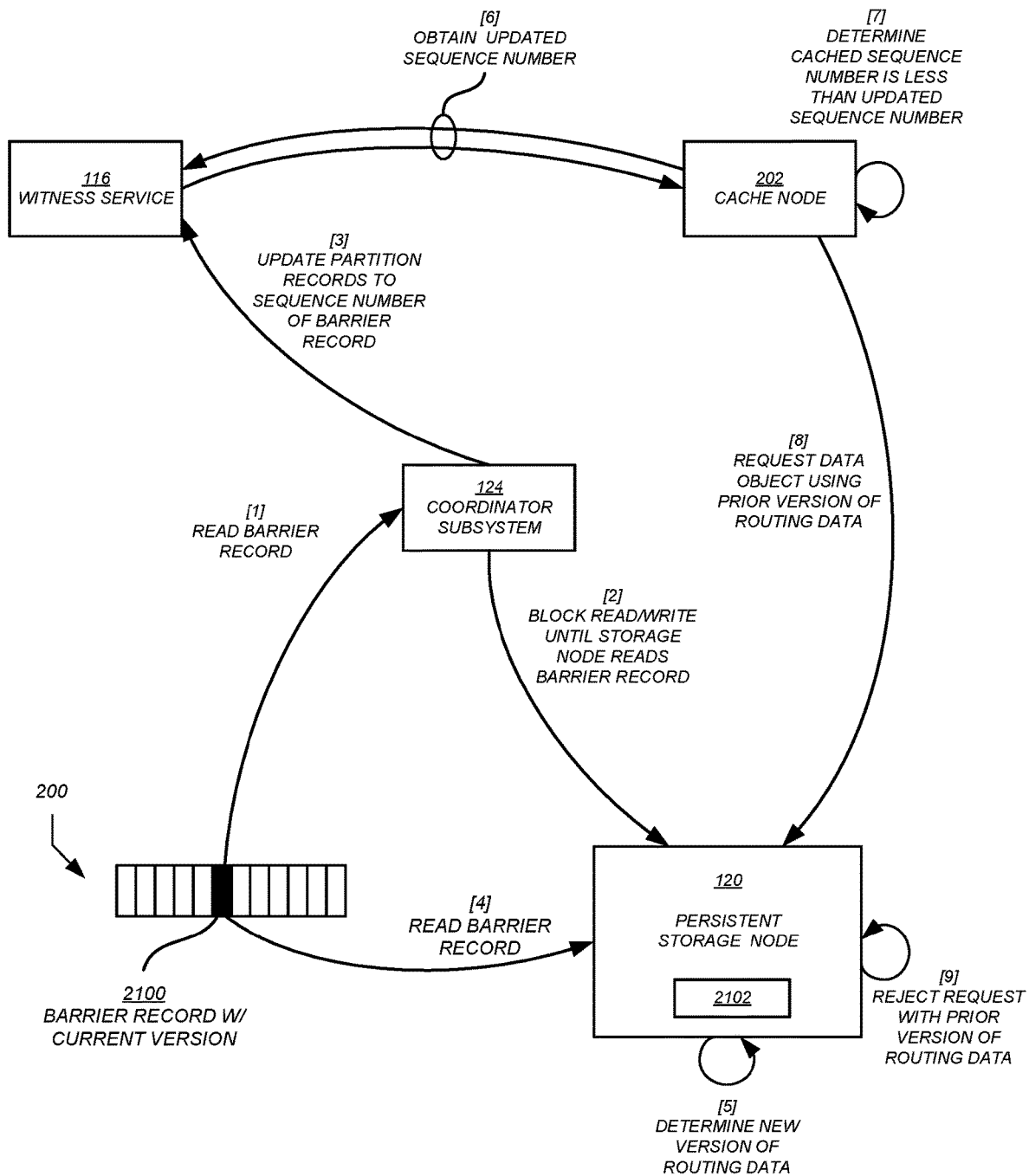
FIG. 21 is a block diagram of illustrative data flows and interactions between systems and services associated with a partition according to some embodiments.

FIG. 21 illustrates an example in which a barrier record 2100 is written to a transaction log 200, from where it may be read by a coordinator subsystem 124 at [1]. The coordinator subsystem 124 thereafter prevents a persistent storage node 120 at [2] from responding to any request until after the persistent storage node 120 has caught up on the transaction log 200 to the barrier record 2100. At [3], the coordinator subsystem 124 may notify the witness service 116 for the current partition that the sequence numbers for keys in the current partition should be updated to the sequence number of the barrier record 2100. Once the persistent storage node 120 reads the barrier record 2100 at [4] (e.g., during the course of reading the records of the transaction log 200 and making any needed changes to persistent storage to reflect the changes recorded in the transaction log 200), the persistent storage node 120 may determine at [5] that a new version of routing data to be used to make requests. The persistent storage node 120 may thereafter reject any request that is made based on an outdated version of the routing data. For example, at [6] a cache node 202 may obtain the updated sequence number for a requested key from the witness service 116 in response to a request for a data object associated with the key. The updated sequence number provided by the witness service 116 may be the sequence number of the barrier record 2100. The cache node 202 may determine at [7] that the sequence number associated with its cached version of the requested data object is less than the sequence number returned from the witness service 116, and may thereafter request an updated version of the data object from the persistent storage node 120 at [8]. The request may be tagged with or otherwise reference the version of routing data used to route the request to the partition. Based on this tag and the new version data 2102 read by the persistent storage node 120 from the barrier record 2100, the persistent storage node 120 may determine at [9] whether to reject the request as being associated with out-of-date routing data.

At block 2008, the control system 1600 can perform a backfill operation in which data is copied from the prior computing resources associated with affected partitions to new computing resources that will manage the affected partitions going forward. In some embodiments, the backfill operation may be performed as a background process while data continues to be read from the prior location, and while new write requests are preformed to both the prior location and new location. For example, the control system 1600 may copy data from persistent storage nodes of the prior set of computing resources into persistent storage nodes of the newly-assigned set of computing resources. Any new write requests that are received during the period in which the intermediate version of routing data is being used are written to both the transaction log of the prior set of computing resources and the transaction log of the new set of computing resources.

At block 2010, the control system 1600 can update the routing data to a transitional state. The transitional state—also referred to as a second intermediate state in cases where it occurs after a first intermediate state—may serve as a transition between (1) the first intermediate state in which read requests are routed to the prior location while write requests are routed to both locations, and (2) the desired end state in which both read and write requests are routed exclusively to the new location.

In some embodiments, control system 1600 can update the routing data to the transitional state by updating both write and read request routing assignments to a null value. In this state, any other system using the routing data will be unable to determine the location to which a request is to be routed, and the request may therefore be rejected. By using this transitional state, the control system 1600 can be assured that there are no pending requests—read or write requests—routed to the old location during/after the routing change to the desired end state in which both read and write requests are routed exclusively to the new location. Once the backfill operation has completed, and because all write requests made since the beginning of the routine 2000 have been routed to both the new location and the prior location, the new location has all data for the affected partitions.

At block 2012, the control system 1600 can notify computing resources associated with the affected partitions that the applicable routing data has been changed. For example, the control system 1600 may write another barrier record to the transaction log of the affected partitions to indicate the newly-updated routing data version number, as described above.

At block 2014 the control system 1600 can update the routing data to read/write exclusively to/from the new location.

At block 2016, the control system 1600 can notify computing resources associated with the affected partitions that the applicable routing data has been changed. For example, the control system 1600 may write another barrier record to the transaction log of the affected partitions to indicate the updated routing data version number, as described above In some embodiments, when a barrier record is written to the transaction log, the barrier may trigger an invalidation of cached versions of data assigned to the transaction log's partition. For example, the coordinator subsystem 124 may generate a notification to the witness service 116 indicating that the sequence number to be applied to all data objects associated with the partition is the transaction log sequence number of the barrier record. Because cache nodes make verification requests to the witness service 116 before serving cached data objects, this update of the sequence number at the witness service can have the effect of invalidating all cached versions of data objects in the partition. Such an operation may be desirable to ensure that cache nodes eventually obtain updated versions from the correct location and communicate with the correct witness service instance based on updated routing information.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A distributed storage system comprising:
a first caching layer comprising a load balancer and a plurality of hot key cache nodes;
a second caching layer comprising a management subsystem and consistent hash ring of a plurality of cache nodes; and
a witness service storing a hash table comprising freshness data that associates a key of a data object with a sequence number representing a most recent change to the data object;
wherein the management subsystem comprises one or more computing devices and is configured to at least:
receive, from the first caching layer, a first request for a first data object, wherein the first request comprises a first key;
identify a first cache node, of the plurality of cache nodes, mapped to the first key based at least partly on a hash function;
send the first request to the first cache node;
receive, from the first caching layer, a second request for a second data object, wherein the second request comprises a second key, and wherein the second request is tagged as a hot key request;
identify a subset of the plurality of cache nodes based at least partly on one or more hashes of the second key;

select a second cache node of the subset of the plurality of cache nodes based at least partly on a pseudo-random number generator; and
send the second request to the second cache node.

2. The distributed storage system of claim 1, wherein the witness service is further configured to:
receive, from a first hot key cache node of the plurality of hot key cache nodes, a verification request comprising the second key;
generate a hash of the second key;
obtain, from the hash table, a first sequence number based on the hash; and
send the first sequence number to the first hot key cache node.

3. The distributed storage system of claim 2, wherein the first hot key cache node is configured to:
receive the first sequence number from the witness service;
determine that a second sequence number associated with cached data regarding the second data object is less than the first sequence number; and
in response to determining that the second sequence number is less than the first sequence number, send the second request to the second caching layer.

4. The distributed storage system of claim 1, wherein the second cache node is configured to retrieve the second data object from a persistent storage node based at least partly on a token bucket algorithm.

5. A computer-implemented method comprising:
under control of a computing system comprising memory and one or more computing devices configured to execute specific instructions:
receiving a first request for a first data object of a plurality of data objects, wherein the first request comprises a first key corresponding to the first data object;
identifying a first cache node of a consistent hash ring comprising a plurality of cache nodes, wherein the first cache node is identified based on a first mapping of the first key to the first cache node;
sending the first request to the first cache node;
receiving a second request for a second data object of the plurality of data objects, wherein the second request comprises a second key corresponding to the second data object, and wherein the second key is one of a plurality of hot keys;
selecting a second cache node of a subset of the plurality of cache nodes based at least partly on randomized selection data, wherein the subset of the plurality of cache nodes is associated with the second key; and
sending the second request to the second cache node.

6. The computer-implemented method of claim 5, further comprising determining that the second request is a hot key request based on at least one of: a type of the second request, data included in the second request, or data indicating that the second key is one of the plurality of hot keys.

7. The computer-implemented method of claim 5, further comprising generating a hash of the first key, wherein identifying the first cache node based on the first mapping comprises identifying the first cache node based on the hash of the first key.

8. The computer-implemented method of claim 5, further comprising generating the randomized selection data using a pseudo-random number generator, wherein the randomized selection data comprises a value in a range corresponding to a quantity of cache nodes in the subset of the plurality of cache nodes associated with the second key.

9. The computer-implemented method of claim 5, further comprising:
generating a plurality of hashes of the second key; and
identifying the subset of the plurality of cache nodes based on the plurality of hashes of the second key.

10. The computer-implemented method of claim 5, wherein receiving the second request comprises receiving the second request from a hot key cache subsequent to the hot key cache determining that a cached version of the second data object is invalid.

11. The computer-implemented method of claim 5, further comprising determining that the first request is not a hot key request, wherein identifying the first cache node is performed in response to determining that the first request is not a hot key request.

12. The computer-implemented method of claim 5, further comprising:
under control of the second cache node, wherein the second cache node comprises one or more processors configured to execute specific instructions:
receiving the second request; and
obtaining the second data object from a persistent storage node based at least partly on a leaky bucket algorithm.

13. The computer-implemented method of claim 5, further comprising:
under control of the second cache node, wherein the second cache node comprises one or more processors configured to execute specific instructions:
adding the second request to a batch of hot key requests; and
in response to the batch of hot key requests satisfying a batch request criterion, sending a batch verification request to a witness service, wherein the batch verification request relates to a freshness of cache data.

14. The computer-implemented method of claim 5, further comprising:
under control of a hot key cache node separate from the consistent hash ring, wherein the hot key cache node comprises one or more processors configured to execute specific instructions:
sending a verification request to a witness service, the verification request comprising a request for a first sequence number representing a most recent change to the second data object;
receiving the first sequence number from the witness service in response to the verification request;
determining that the first sequence number is greater than a second sequence number associated with cache data regarding the second data object; and
sending the second request to the computing system in response to determining that the first sequence number is greater than a second sequence number.

15. The computer-implemented method of claim 14, further comprising:
under control of the witness service, wherein the witness service comprises one or more processors configured to execute specific instructions:
receiving, from the hot key cache node, the verification request comprising the second key;
generating a hash of the second key;
obtaining the first sequence number from a hash table based at least partly on the hash; and
sending the first sequence number to the hot key cache node.

16. A system comprising:
a plurality of cache nodes; and
one or more computing devices programmed by executable instructions to at least:
receive a first request for a first data object of a plurality of data objects, wherein the first request is associated with a first key corresponding to the first data object;
identify a first cache node of the plurality of cache nodes, wherein the first cache node is identified based on a first mapping of the first key to the first cache node;
send the first request to the first cache node;
receive a second request for a second data object of the plurality of data objects, wherein the second request is associated with a second key corresponding to the second data object, and wherein the second key is one of a plurality of hot keys;
select a second cache node of a subset of the plurality of cache nodes based at least partly on randomized selection data, wherein the subset of the plurality of cache nodes is associated with the second key; and
send the second request to the second cache node.

17. The system of claim 16, wherein to identify the first cache node, the one or more computing devices are programmed by further executable instructions to select the first cache node from a second subset of the plurality of cache nodes, wherein the second subset of the plurality of cache nodes is associated with the first key, and wherein a quantity of nodes in the second subset of the plurality of cache nodes is less than a quantity of nodes in the subset of the plurality of cache nodes associated with the second key.

18. The system of claim 16, wherein the one or more computing devices are programmed by further executable instructions to determine that the second request is a hot key request based on at least one of: a type of the second request, data included in the second request, or data indicating that the second key is one of the plurality of hot keys.

19. The system of claim 16, wherein the one or more computing devices are programmed by further executable instructions to generate a hash of the first key, wherein identifying the first cache node based on the first mapping comprises identifying the first cache node based on the hash of the first key.

20. The system of claim 16, wherein the second cache node is configured to:
add the second request to a batch of hot key requests; and
in response to the batch of hot key requests satisfying a batch request criterion, send a batch verification request to a witness service, wherein the batch verification request relates to a freshness of cache data.

* * * * *

UNITED STATES PATENT AND TRADEMARK OFFICE
CERTIFICATE OF CORRECTION

PATENT NO. : 11,537,516 B1
APPLICATION NO. : 17/491004
DATED : December 27, 2022
INVENTOR(S) : Tyler Michael Jung et al.

It is certified that error appears in the above-identified patent and that said Letters Patent is hereby corrected as shown below:

In the Drawings

On Sheet 17 of 22, Fig. 16, Line 11 (Approx.), delete "TROUGH" and insert --THROUGH--.

In the Specification

In Column 1, Line 22 (Approx.), delete "CONSISIENCY" and insert --CONSISTENCY--.

In Column 1, Line 28 (Approx.), delete "CONSISIENCY" and insert --CONSISTENCY--.

In Column 11, Line 37, delete "like" and insert --like.--.

In Column 23, Line 41, delete "[D]" and insert --[D].--.

In Column 27, Line 19, after "verified", delete "to the".

In Column 42, Line 3, delete "above" and insert --above.--.

Signed and Sealed this
Twenty-fifth Day of April, 2023

*Katherine Kelly Vidal*

Katherine Kelly Vidal
*Director of the United States Patent and Trademark Office*